US012560246B2

(12) United States Patent
Sethi et al.

(10) Patent No.: US 12,560,246 B2
(45) Date of Patent: Feb. 24, 2026

(54) SHUT-OFF VALVE COMPONENT

(71) Applicants:Sunny Sethi, Castro Valley, CA (US); Nicholas James McKibben, Oakland, CA (US); Grant Harrison Friesen, Concord, CA (US); Sagar Bhatia, Fremont, CA (US)

(72) Inventors: Sunny Sethi, Castro Valley, CA (US); Nicholas James McKibben, Oakland, CA (US); Grant Harrison Friesen, Concord, CA (US); Sagar Bhatia, Fremont, CA (US)

(73) Assignee: HEN NOZZLES INC., Hayward, CA (US)

( * ) Notice: Subject to any disclaimer, the term of this patent is extended or adjusted under 35 U.S.C. 154(b) by 37 days.

(21) Appl. No.: 18/596,852

(22) Filed: Mar. 6, 2024

(65) Prior Publication Data

US 2024/0301959 A1 Sep. 12, 2024

Related U.S. Application Data

(60) Provisional application No. 63/539,188, filed on Sep. 19, 2023, provisional application No. 63/450,120, filed on Mar. 6, 2023.

(51) Int. Cl.
*F16K 5/06* (2006.01)
*A62C 31/02* (2006.01)
*F16K 31/60* (2006.01)

(52) U.S. Cl.
CPC ............ *F16K 5/0647* (2013.01); *A62C 31/02* (2013.01); *F16K 5/0605* (2013.01);
(Continued)

(58) Field of Classification Search
CPC .... F16K 5/0647; F16K 5/0605; F16K 5/0663; F16K 31/602; F16K 5/0689; A62C 31/02
See application file for complete search history.

(56) References Cited

U.S. PATENT DOCUMENTS 3,446,477 A * 5/1969 Ainsworth ................ F16K 5/12
251/118
4,103,868 A * 8/1978 Thompson ............ F16K 5/0605
251/315.08

(Continued)

FOREIGN PATENT DOCUMENTS

CH 240951 A1 2/1946

OTHER PUBLICATIONS

International Searching Authority, International Search Report and Written Opinion issued May 13, 2024, which pertains to PCT Patent Application No. PCT/US2024/018631. 15 pgs.

(Continued)

*Primary Examiner* — John Bastianelli
(74) *Attorney, Agent, or Firm* — Thompson Hine LLP

(57) ABSTRACT
A fluid flow component including a body having a flow path therein, and a blocking component movable between a closed position where the blocking component blocks a flow of fluid through the flow path, and an open position where the blocking component does not block the flow of fluid through the flow path. The blocking component is rotatable about a center axis and includes a partial spherical outer surface that extends 270 degrees or less relative to the center axis. The component further includes an inlet seat that at least partially overlaps with the blocking component along a length of the flow path. An inner surface of the inlet seat is aligned with a portion of the body located immediately upstream of the inlet seat.

26 Claims, 27 Drawing Sheets

(52) U.S. Cl.
CPC .......... *F16K 5/0663* (2013.01); *F16K 5/0689*
(2013.01); *F16K 31/602* (2013.01)

(56) References Cited

U.S. PATENT DOCUMENTS

| | | | | |
|---|---|---|---|---|
| 4,850,567 | A * | 7/1989 | Ambrosi | F16K 47/023 |
| | | | | 464/36 |
| 6,047,952 | A * | 4/2000 | Laskaris | F16K 5/0663 |
| | | | | 251/315.11 |
| 7,011,109 | B2 * | 3/2006 | Tran | F16K 5/0605 |
| | | | | 251/118 |
| 7,124,965 | B1 | 10/2006 | Chen | |
| 8,403,293 | B2 * | 3/2013 | Cowie | F16K 5/204 |
| | | | | 251/192 |
| 11,519,509 | B2 | 12/2022 | Shorback et al. | |
| 2005/0285068 | A1 | 12/2005 | Dalluge et al. | |
| 2016/0281462 | A1 | 9/2016 | Rytlewski et al. | |
| 2017/0370180 | A1 | 12/2017 | Manett et al. | |
| 2022/0297138 | A1 | 9/2022 | Sethi | |

OTHER PUBLICATIONS

U.S. Appl. No. 63/433,892, entitled Smooth Bore Nozzle, filed Dec. 20, 2022. 56 pgs.
U.S. Appl. No. 18/390,659, entitled Adjustable Nozzle, filed Dec. 20, 2023. 63 pgs.

* cited by examiner

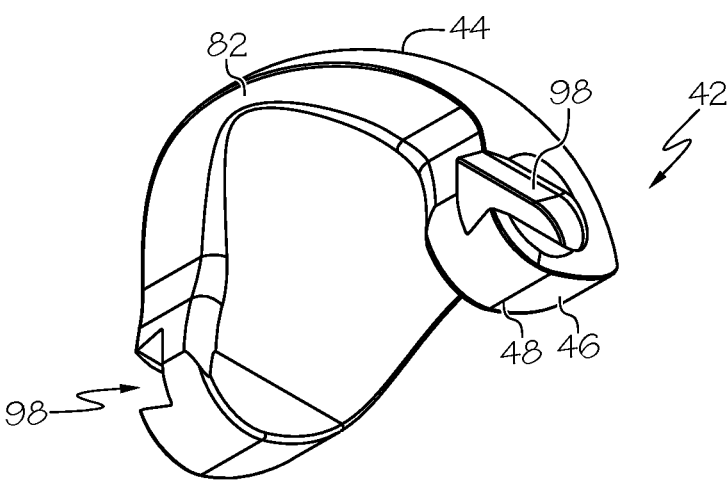
FIG. 20
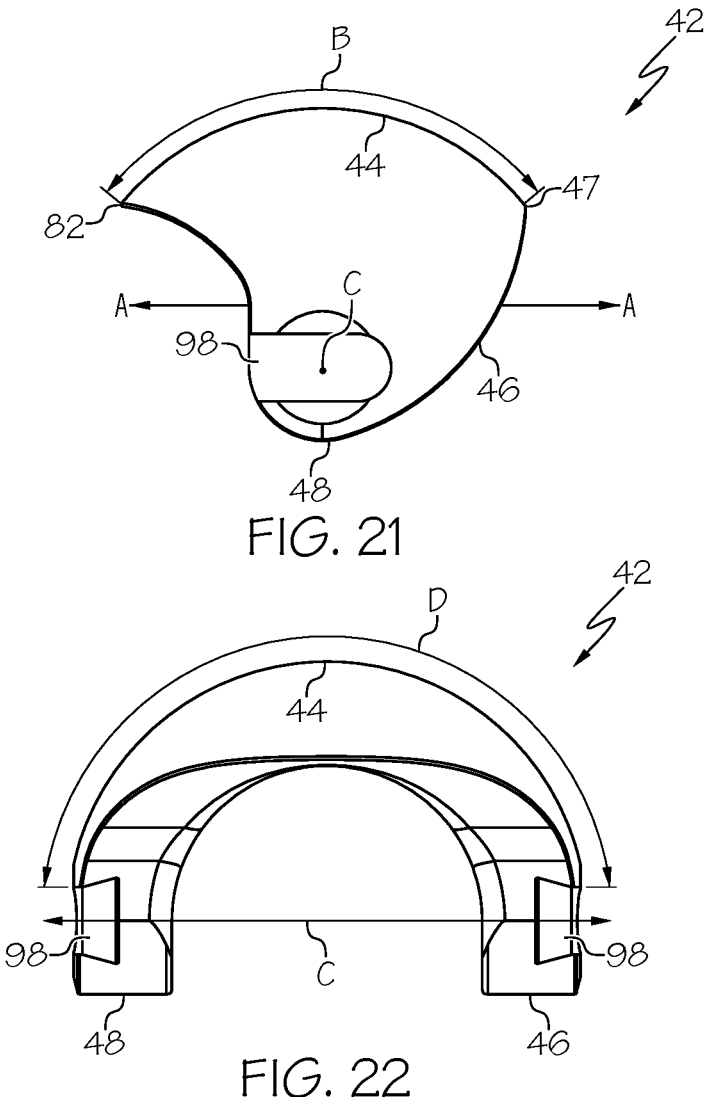
FIG. 21
FIG. 22

SHUT-OFF VALVE COMPONENT

This application claims priority to U.S. Provisional Application Ser. No. 63/450,120, filed on Mar. 6, 2023 and entitled Shut-Off Valve Component, and U.S. Provisional Application Ser. No. 63/539,188, filed on Sep. 19, 2023 and entitled Shut-Off Valve Component. The entire contents of both of those applications are incorporated by reference herein.

This invention was made with government support under Contract No. 2127461 awarded by The National Science Foundation. The government has certain rights in the invention.

The present invention relates to a component with a shut-off valve, and more particularly to a component with shut-off valve that can also be used as a throttle control system or device.

BACKGROUND

Shutoff valves are used to regulate the flow of fluid therethrough. There are numerous types of shutoff valves, including butterfly valves, gate valves and ball valves. Such valves are typically designed to provide optimal performance when in either the fully open or fully closed positions. In contrast, when such valves are in a partially open/partially closed position they typically introduce turbulence into the fluid flow and/or induce mechanical stress on the valve components.

Other types of valves such as diaphragm valves and pinch valves can be used when throttle control is desired. However, the actuation mechanism of these valves is typically not designed for fast operations, and such valves may be bulky.

The most common valve used with fire-fighting nozzles is a ball shut-off valve. In a ball shut-off valve, a spherical actuator is used to regulate the flow of fluid through the valve and thereby through the nozzle. To stop the flow of the fluid through the ball valve, the spherical actuator (ball) makes intimate contact with a compliant material (seat) that is positioned adjacent to the ball. A typical ball valve has two seats: one seat on the upstream side of the ball and another seat one on the downstream side of the ball. However, such valves typically generate very high turbulence in partially open and/or partially closed positions.

SUMMARY

The present disclosure is directed to a shut off valve that can provide ease of operation, similar to conventional ball valves, but can provide improved flow through the valve when the valve is partially opened/closed. In one embodiment, the invention a fluid flow component including a body having a flow path therein, and a blocking component movable between a closed position where the blocking component blocks a flow of fluid through the flow path, and an open position where the blocking component does not block the flow of fluid through the flow path. The blocking component is rotatable about a center axis and includes a partial spherical outer surface that extends 270 degrees or less relative to the center axis. The component further includes an inlet seat that at least partially overlaps with the blocking component along a length of the flow path. An inner surface of the inlet seat is aligned with a portion of the body located immediately upstream of the inlet seat.

BRIEF DESCRIPTION OF THE DRAWINGS

FIG. 20 is another perspective view of the blocking component of the component of FIG. 1;

FIG. 21 is a side view of the blocking component of the component of FIG. 1;

FIG. 22 is a front view of the blocking component of the component of FIG. 1;

DETAILED DESCRIPTION

With reference to FIGS. 1-4, in one embodiment, a fluid flow component, generally designated 10, is configured to be coupled to a nozzle, generally designated 12. The component 10 and/or nozzle 12 are configured to be coupled to a fluid source (not shown), which can provide fluid under pressure. The fluid can in one case be provided to the component 10/nozzle 12 at such pressures as are provided by a firefighting water supply, including a fire hydrant and/or fire pumper. The fluid source can thus provide water or other liquids/fluid at a pressure of, in one case, between about 25 psi and about 1400 psi, or between about 100 psi and about 800 psi in another case, or greater than about 25 psi and/or 100 psi; and/or less than about 400 and/or 800 psi in other cases.

The component 10/nozzle 12 may be coupled to a hose, such as a firefighter handline, that itself constitutes or is in turn coupled to the fluid source. The component 10 can be coupled to the nozzle 12 to provide fluid communication such that fluid can flow through the component 10 and exit through the nozzle 12. Alternatively the component 10 can be integrally and non-removably coupled to, or form part of, the nozzle 12. In yet another embodiment, the component 10 can be used as a stand-alone component or coupled to devices other than the nozzle 12.

Figure 1:
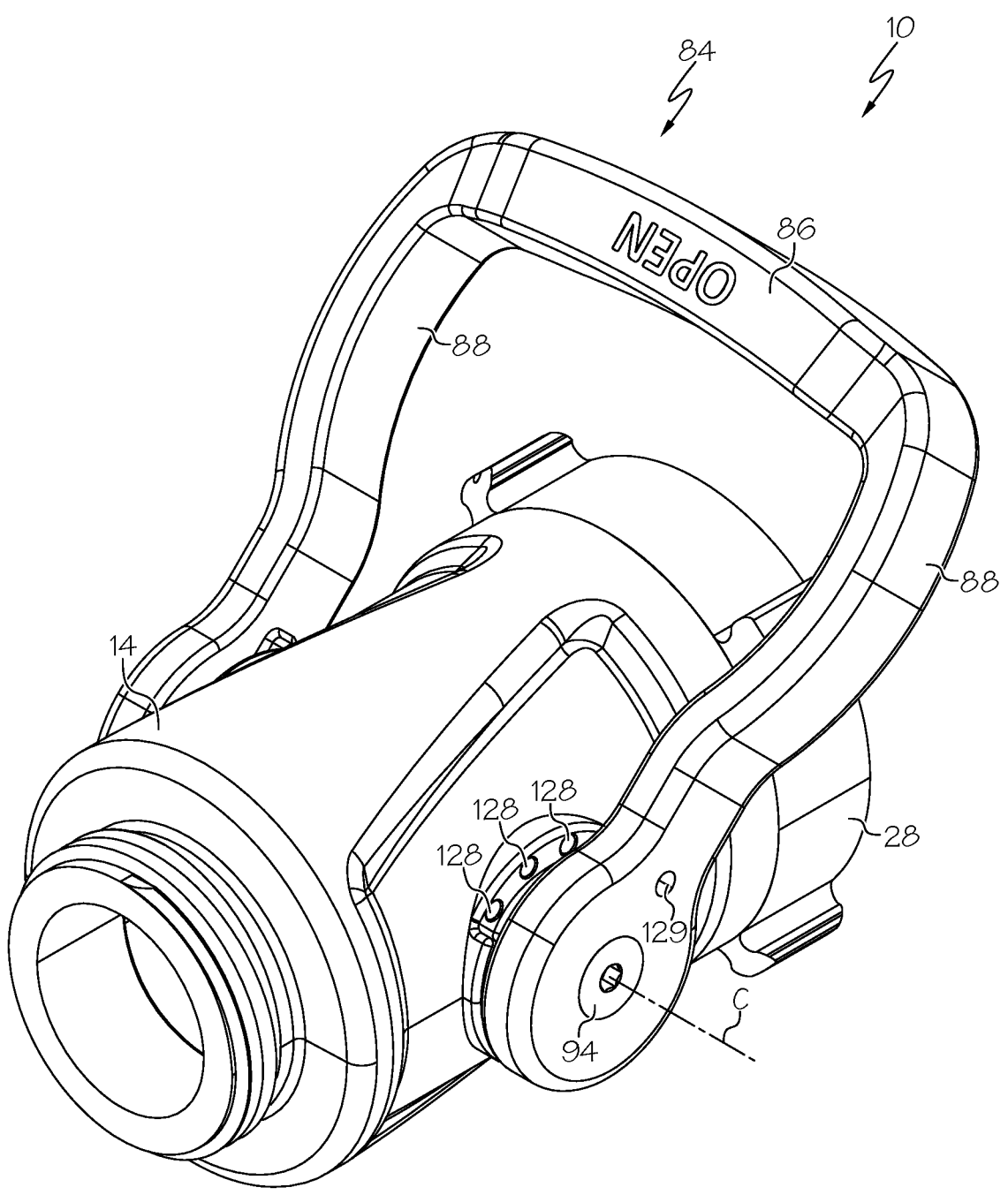
FIG. 1 is a perspective view of one embodiment of a fluid flow component.
Figures 2, 3:
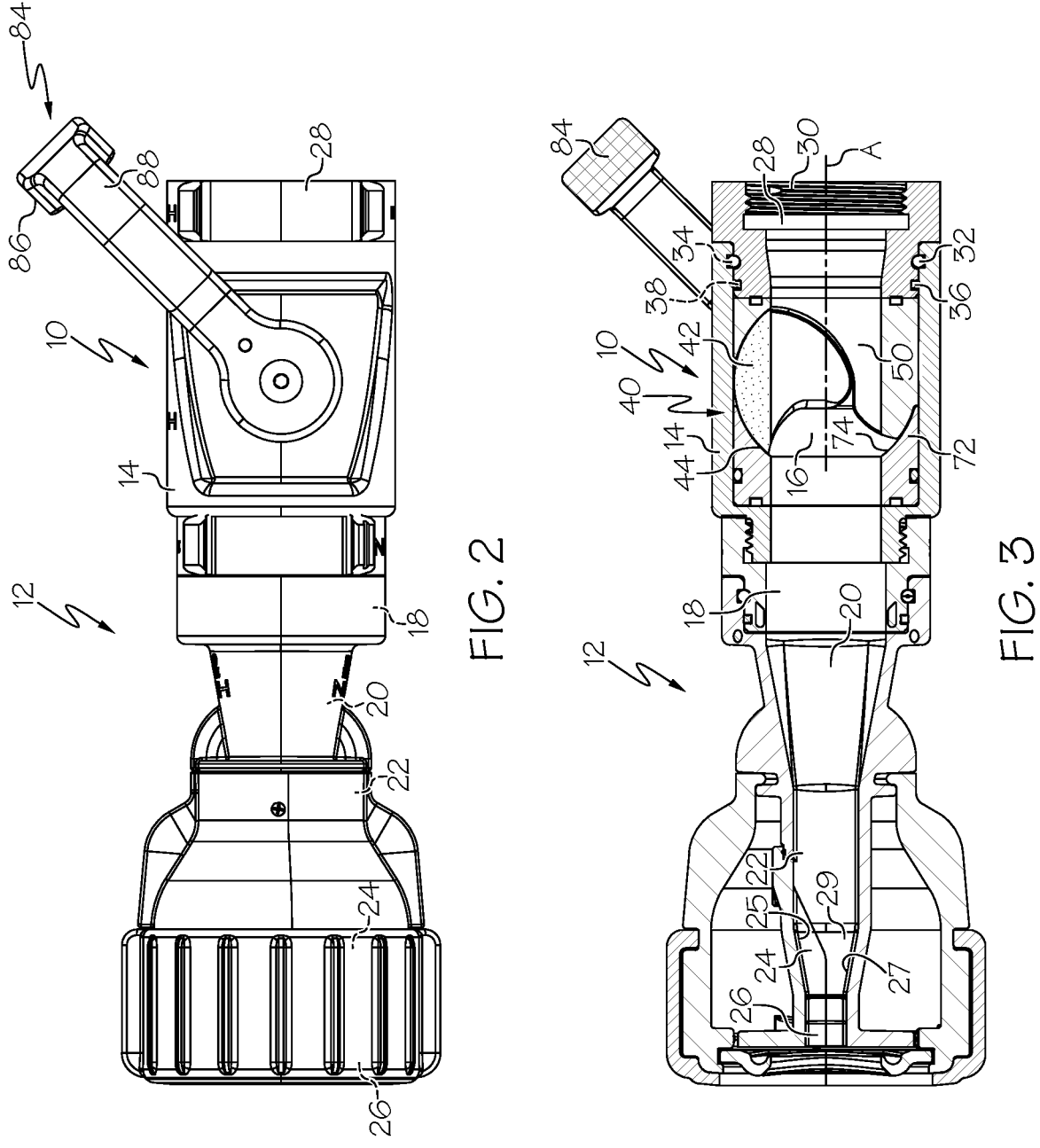
FIG. 2 is a side view of the component of FIG. 1, shown in conjunction with a nozzle.
FIG. 3 is a side cross section of the component and nozzle of FIG. 2.

The component 10 can include a body 14 having a central axis A (FIG. 3), and including or defining therein a flow path or fluid path 16 therein through which fluid is configured to flow in a flow (downstream) direction (the right-to-left direction in FIGS. 1-4). With reference to FIG. 3, the nozzle 12, when utilized, can have (or its flow path can have) an inlet section 18, a converging section 20 positioned downstream of the inlet section 18 relative to the flow direction, a transition section 22 positioned downstream of the converging section 20, a hybrid section 24 positioned downstream of the transition section 22, and a flow modulation section 26 positioned downstream of the hybrid section 24. The nozzle 12 can include control arms (not shown) positioned in the flow modulation section 26 that are movable toward or away from a center A of the component 10/nozzle 12/flow path 16 to control the spray pattern of fluid exiting the nozzle 12.

In the hybrid section 24, the nozzle 12 can have two opposed (top 25 and bottom 27) walls that converge in the downstream direction, and two opposed side walls 29 (only one of which is visible in FIG. 3) that diverge in the downstream direction. However, it should be understood that the nozzle 12 may not include any one, or multiple ones, of the inlet section 18, converging section 20, transition section 22, hybrid section 24, flow modulation section 26 and/or control arms. The nozzle 12 can also include other or additional sections or the like not shown or described herein. Other details relating to the nozzle 12 and other aspects can be found in U.S. patent application Ser. No. 17/828,087, filed on May 31, 2022 and entitled Smooth Bore Nozzle, and U.S. Provisional Application Ser. No. 63/433,892, filed on Dec. 20, 2022 and entitled Smooth Bore Nozzle, and U.S. patent application Ser. No. 18/390,659, filed on Dec. 20, 2023 and entitled Adjustable Nozzle, the entire contents of each of which are hereby incorporated by reference.

The component 10 can include an inlet section 28 coupled to or forming part of the body 14 that is, in one case, generally cylindrical and/or generally circular in cross section. In some cases the inlet section 28 can be considered part of the body 14 of the component 10. In one embodiment the inlet section 28 includes a female threaded section 30 at one axial end is configured to be coupled to the fluid source such as a hose, landline or the like and/or configured to be coupled an adapter, such as a threaded swivel adaptor configured to attach the component 10 to the fluid source. The component 10 can include a series of balls 32 received in an annular recess 34 of the inlet section 28, and a seal 36 received in another annular recess 38 the inlet section 28. Alternatively an inner or outer threaded surface, or other surface or component, configured to be coupled to the fluid source (e.g. hose, in one case) can be provided and/or be integrally formed in or on the component 10/inlet section 28.

The component 10 can include a valve 40 including a blocking component 42 that is movable between an open position (FIGS. 3, 5, and 6) where the blocking component 42 does not block flow of fluid through the flow path 16, and a closed position (FIGS. 15 and 16) where the blocking component 42 blocks or completely blocks the flow of fluid through the flow path 16. The valve 40/blocking component 42 is also movable to an intermediate position (a partially open position and/or partially closed position, but termed a partially closed position herein; see FIGS. 10-13) where the valve 40/blocking component 42 does not entirely block the flow of fluid through the flow path 16, but allows lesser fluid flow and/or provides greater blockage in the flow path 16, as compared to when the valve 40/blocking component 42 is in the open position. In one case the valve 40/blocking component 42 is in the partially closed position when the valve 40/blocking component 42 is midway between the open and closed positions with regard to the range of rotation/movement of the blocking component 42 between the open and closed positions.

The blocking component 42 can include or take the form of a partial ball valve, and thus includes a curved outer surface 44 such as a spherical/partial spherical outer surface 44. In one case, the outer surface 44 extends 180 degrees or less, or 270 degrees or less in another embodiment, relative to the center point of the blocking component 42 in all directions and orientations and/or greater than 90 degrees in one case, or greater than 120 degrees in another case. More particularly, in one case the outer surface 44 extends 180 degrees or less, or 270 degrees or less, or 90 degrees or more, or 120 degrees or more, relative to the center/pivot axis C thereof in a vertically oriented plane aligned with a center of the flow path 16 and parallel with the central axis A (where the plane is parallel to the flow path 16) as shown by angle B of FIG. 21. In one case angle B is greater than about 60 degrees and/or less than about 180 degrees.

The outer surface 44 can extend 180 degrees or less or 270 degrees or less relative to a plane aligned with an axis of rotation C of the blocking component 42 and perpendicular to the central axis A, as shown by angle D of in FIG. 22. In another case, a longest continuous outer surface of the blocking component 42 (e.g. the longest continuous straight line (straight except for spherical curvature) that can be drawn on spherical surface 44 the blocking component 42) extends 60 degrees or less, or 120 degrees or less, or 180 degrees or less, or 270 degrees or less. Thus, the blocking component 42 can have a lesser surface area compared to a conventional ball valve, and in one case has an outer surface area less than ¾ in one case, or less than ½ in another case, of an outer surface area of a complete sphere having the same radius.

As shown in FIGS. 17-22, the blocking component 42 can have a non-spherical base portion 46 located at a radially outer portion thereof and extending generally circumferentially in side view, as shown in FIG. 21. The base portion 46 can be an upstream edge of the blocking component 42 having or comprising an angled surface (taper or angled downwardly relative the flow direction). The base portion 46 can also be a tapered surface with regard to its thickness, having its smallest thickness at a center point 47 (FIGS. 18 and 21; in one case aligned with the central axis A), and having a greater thickness moving away the center point 47. The base portion 46 can extend generally radially outwardly from the center point 47 of the blocking component 42 in end view, as shown for example in FIG. 18. The blocking component 42 can also include a pair of opposed, curved lower portions 48 at a radially outer portion thereof and positioned adjacent to and/or form part of the base portion 46.

Figure 23:
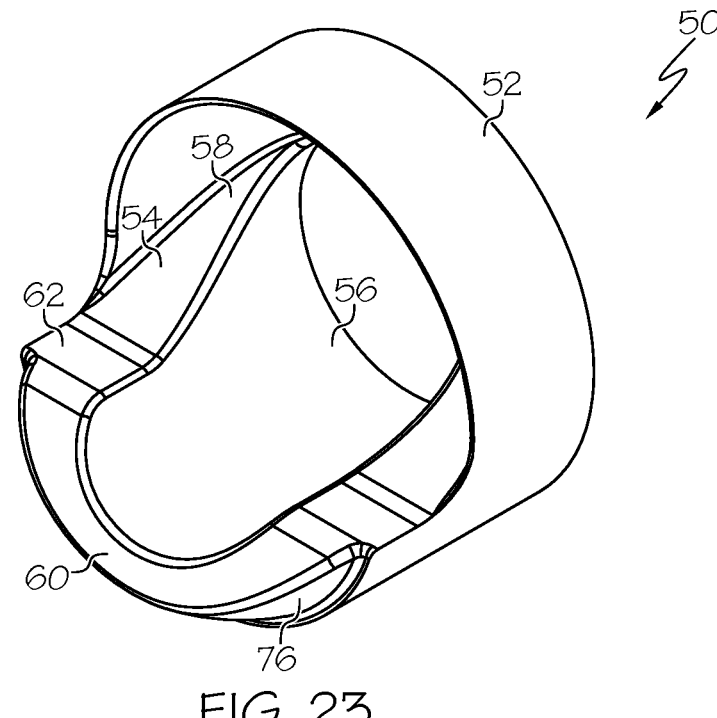
FIG. 23 is a perspective view of the inlet seat of the component of FIG. 1.
Figure 24:
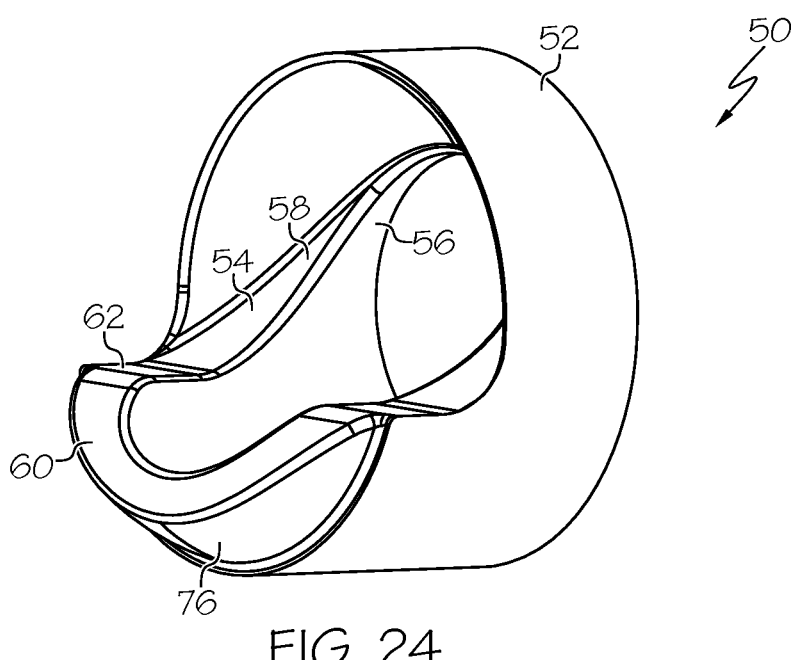
FIG. 24 is another perspective view of the inlet seat of the component of FIG. 1.

The component 10/valve 40 can include an inlet seat 50 positioned generally upstream of the blocking component 42 and adjacent to and/or in contact with the blocking component 42. With reference to FIGS. 23 and 24 the inlet seat 50 can include a relatively thin, cylindrical base portion 52 located at a radially outer portion thereof and extending circumferentially around an entirety of the flow path 16 in a complete loop. The inlet seat 50 can also include an contoured portion 54 positioned inside the base portion 52 having or defining a cylindrical or partially cylindrical inner surface 56. The contoured portion 54 can be located radially outside the inner surface 56 and include an upstream, radially-outwardly positioned tapered surface 58 (tapered downwardly, moving in the downstream direction). The contoured portion 54 can also include an axially downstream, radially-outwardly positioned tapered surface 60, and a generally flat (axially-extending), radially-outwardly positioned surface 62 positioned between the upstream 58 and downstream 60 tapered surfaces.

Figures 6, 7:
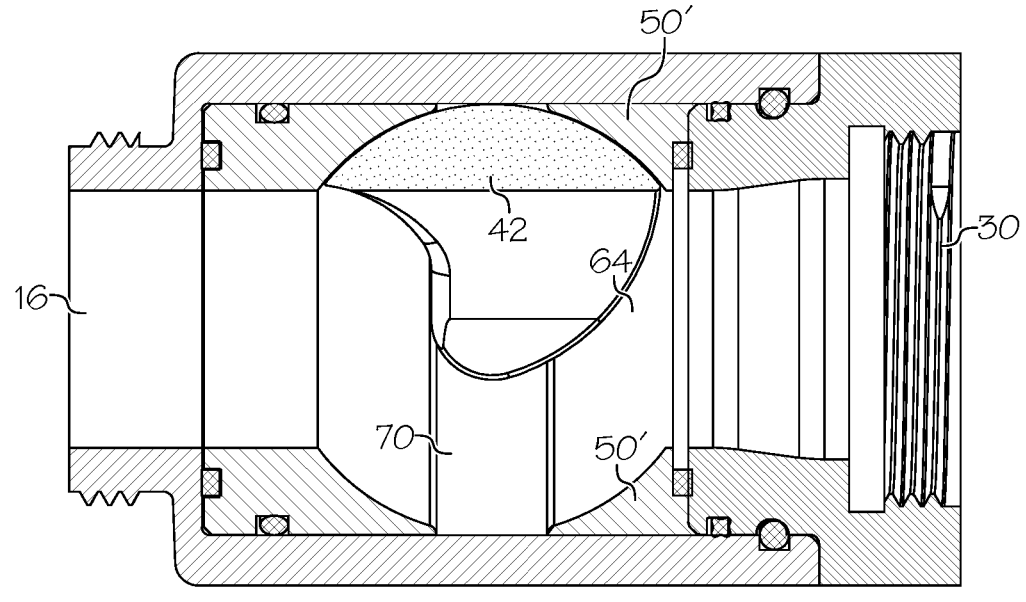
FIG. 6 is a side view of the component of FIG. 5.
FIG. 7 is a side view of a component with a conventional ball valve seat, in the open position.
Figure 10:
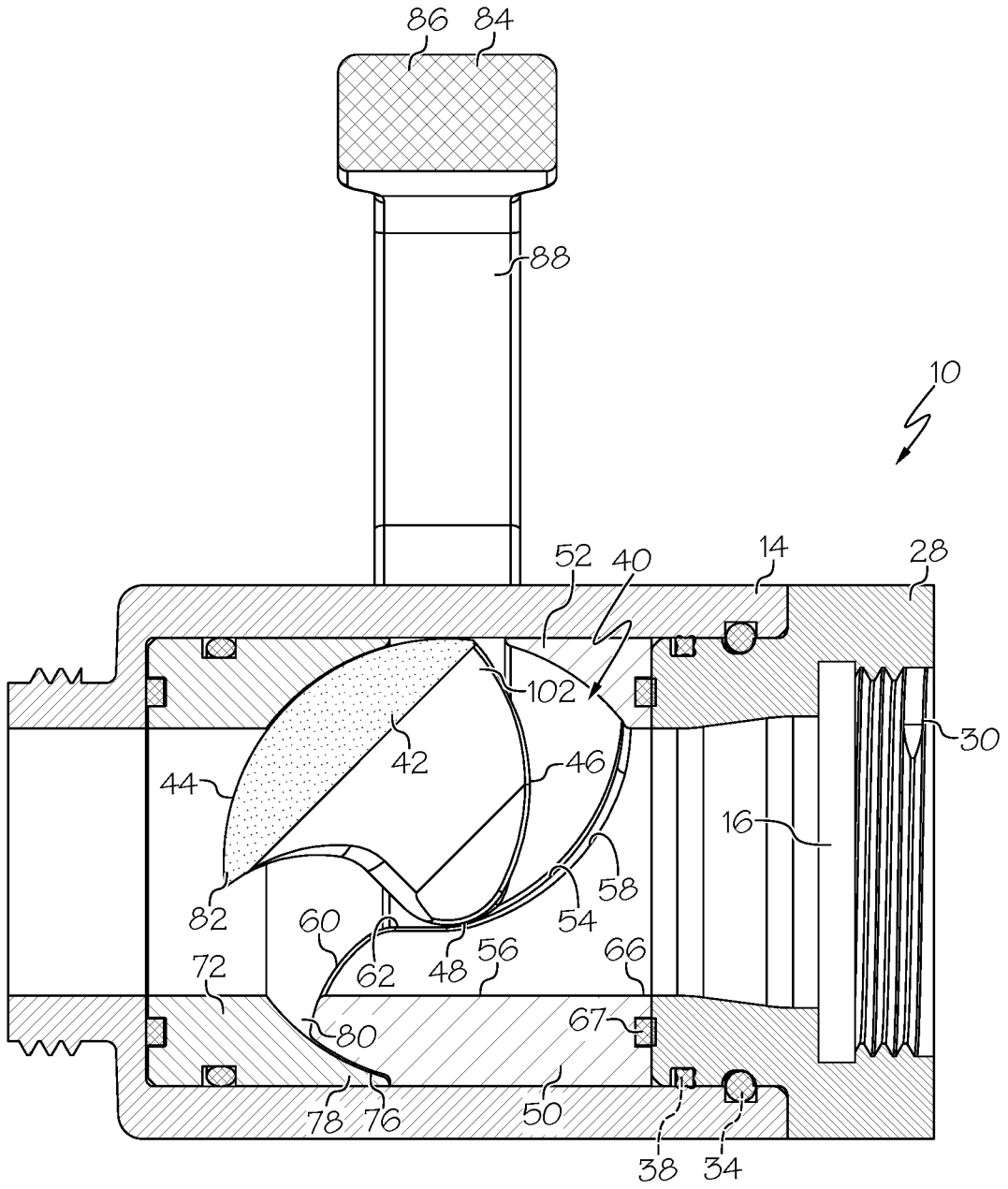
FIG. 10 is a side cross section of the component of FIG. 1, in a partially closed position.
Figure 15:
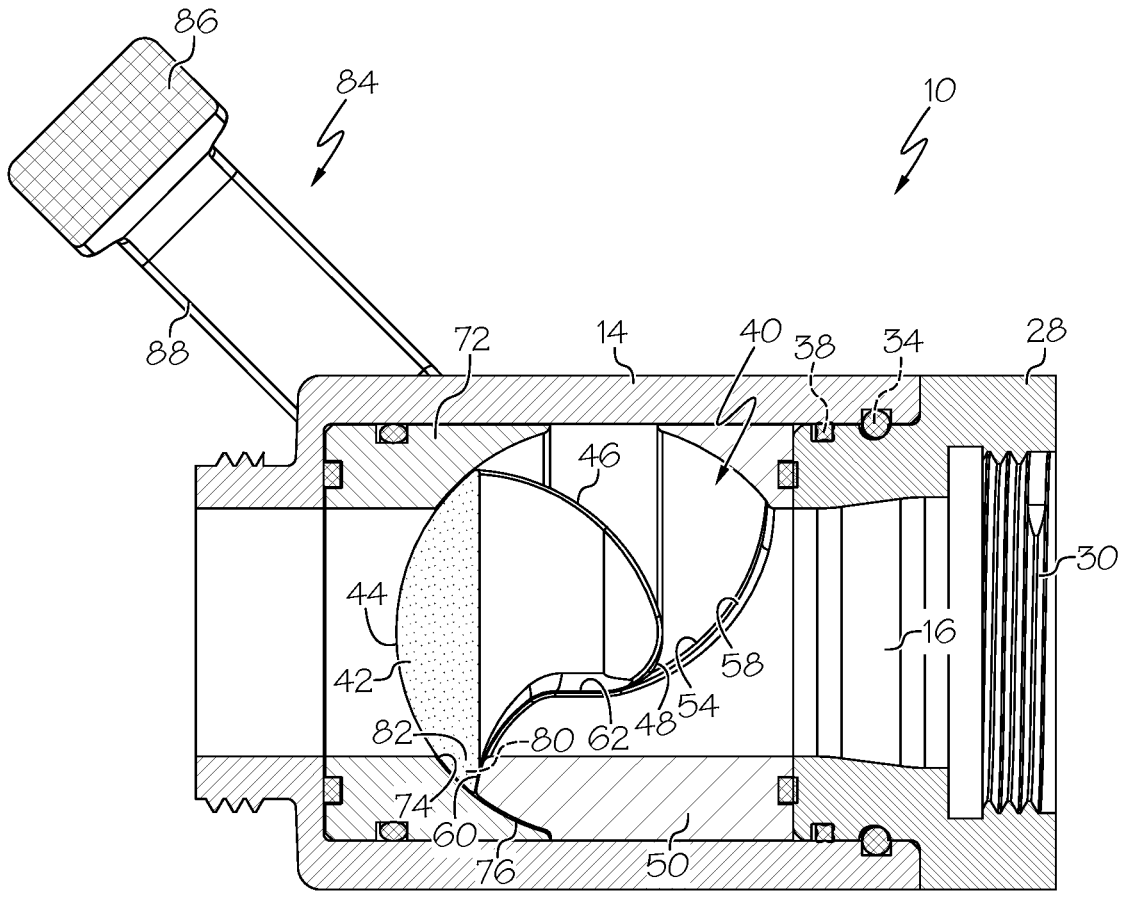
FIG. 15 is a side cross section of the component of FIG. 1, in the closed position.

The inlet seat 50 can at least partially axially overlap with the blocking component 42 along a length of the flow path 16. In one case the inlet seat 50 and/or its inner surface 56 overlap with at least about 50% in one case, and at least about 75% in another case, and in another case about 100%, of the blocking component 42 along the length of the flow path 16 when the blocking component 42 is in the open and/or closed and/or partially closed position. As shown in FIGS. 6, 10, and 15, the lower portion 48 of the blocking component 42 can be positioned adjacent to and/or rest upon the flat surface 62 of the inlet seat 50. In this manner the blocking component 42 can pivot/rock upon the inlet seat 50 when the blocking component 42 moves between the open, closed and partially closed positions.

Figure 8:
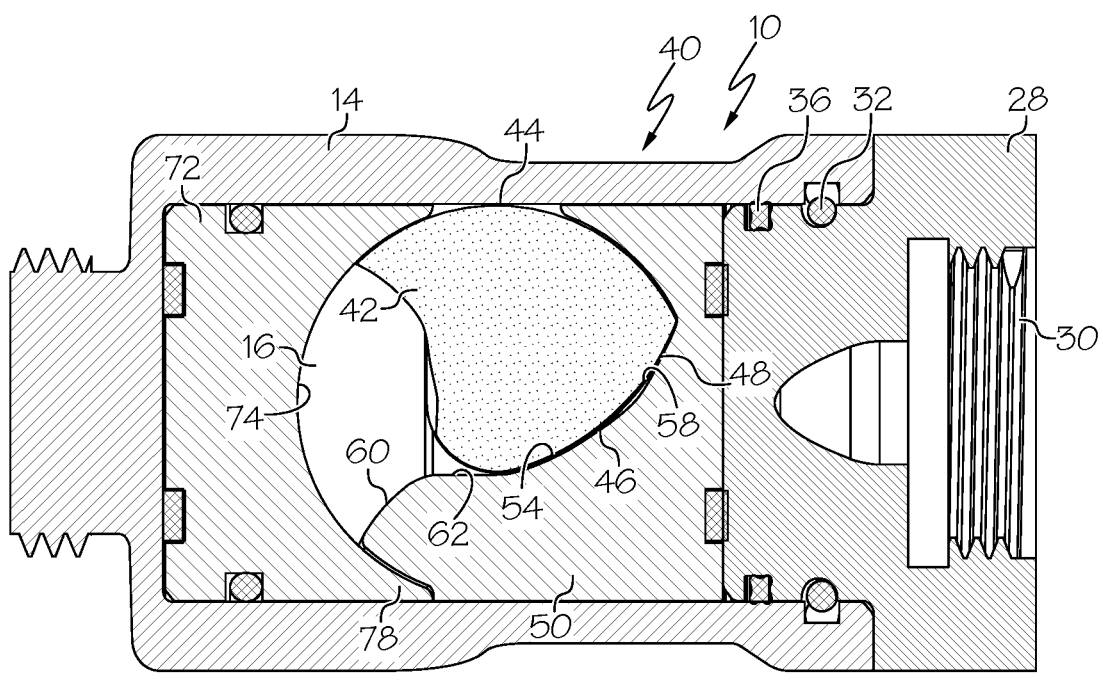
FIG. 8 is a side offset/radial cross section of the component of FIG. 5.

When the valve 40/blocking component 42 is in the open position, the base portion 46 of the blocking component 42 is positioned adjacent to the upstream tapered surface 58 of the inlet seat 50, as shown in FIGS. 6 and 8. In particular, the base portion 46 of the blocking component 42 can have a nesting/complementary shape with the upstream tapered surface 58 of the inlet seat 50 such that they fit closely together when the valve 40/blocking component 42 is in the open position to provide smooth flow for fluid entering the valve 40.

A conventional ball valve inlet seat 50' has a cylindrical inner cavity, with a spherically curved axial end designed to mate with the spherical ball and create a seal. If a conventional ball valve inlet seat 50' were to be used, as shown in FIG. 7, a gap 70 would be positioned between the blocking component 42 and the ball valve inlet seat 50', which would introduce turbulence into the fluid flow. In this manner, the inlet seat 50 is configured to closely receive/engage the non-spherical portions of the blocking component 42. Conventional ball valve inlet seats 50' are not designed to nest with a partially spherical blocking component 42 to create a uniform flow pathway, and use of a conventional ball valve inlet seat 50' with the blocking component 42 shown herein would lead to high levels of turbulence being introduced into the fluid stream.

Figure 9:
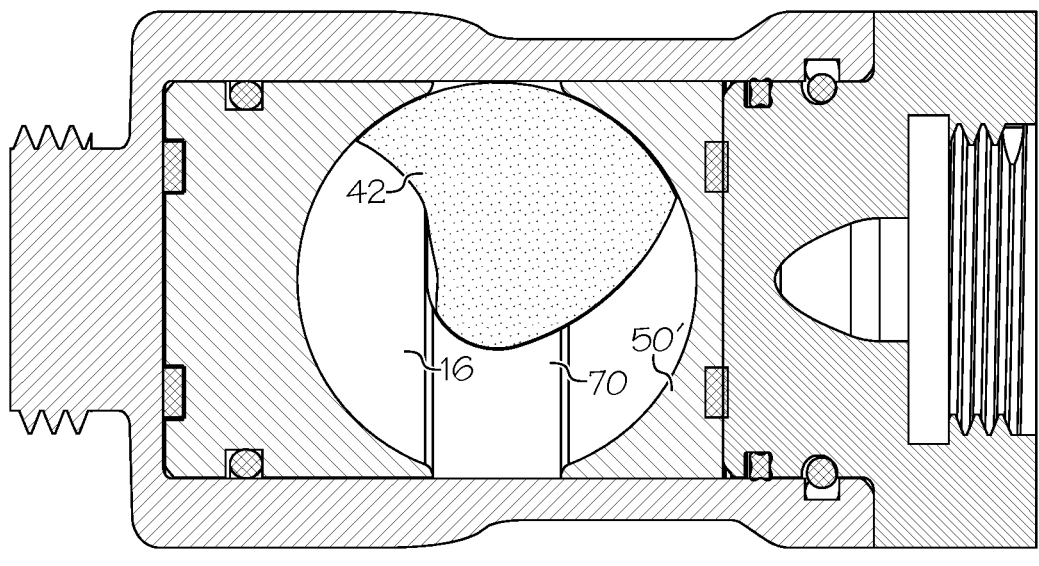
FIG. 9 is a side offset/radial cross section of a component with a conventional ball valve seat, in the open position.

In addition, an upstream lower end 66 (FIG. 6) of the inner surface 56 of the inlet seat 50 can be aligned (e.g. in the radial direction) with a portion 67 of the flow path 16/body 14 located immediately upstream of the inlet seat 50 to provide smooth flow for fluid entering the valve 40. The upstream lower end 66 of the inner surface 56 of the inlet seat 50 can be aligned in the radial direction such that any gap or difference in diameter between the upstream lower end 66 and the inner surface 56 is less than 5% of an effective diameter of the flow path 16 at such gap, or less 1% in another case, and less than 0.5% in another case. In this manner the inner surface 56 of the inlet seat 50 can be generally straight/aligned with the central axis A and the direction of fluid flow to provide a smooth, continuous surface, and to fill the gap 70 (FIGS. 7 and 9) that would be present if a conventional ball valve inlet seat 50' were to be used. In this manner, a first portion (trailing edge 83) of the blocking component 42 is configured to sealingly engage a first portion (base portion 52) of the inlet seat 50 when the blocking component 42 is in the open position, and a second portion (leading edge 82) of the blocking component 42 is configured to sealingly engage a second portion (adjacent recess 80 of the inlet seat 50 when the blocking component 42 is in the closed position, as shown in FIG. 15. The first and second portions of the inlet seat 50 are located on opposite sides of a central axis A of the flow path 16.

The aligned, upstream lower end 66 can overlap in the axial direction with the blocking component 42, and may extend in a straight or generally straight manner in the axial direction at least about 50% in one case or at least about 75% in another case of a length of the valve 40 and/or blocking component 42 in the axial direction. The inner surface 56 can extend downstream axially a length of at least about 75% in one case or at least about 90% in another case of a length of the inlet seat 50 and/or blocking component 42 and/or valve 40 to provide smoothly guided fluid flow. The axial overlap/axially forwarding extending portion of the inner surface 56 helps to ensure a smooth cylindrical flow path to incoming fluid, and fills the gap 70 to provide a smooth continuous cylindrical flow pathway extending through all or most of the valve 40 when the valve 40/blocking component 42 is in the open position, reducing turbulence.

Figure 5:
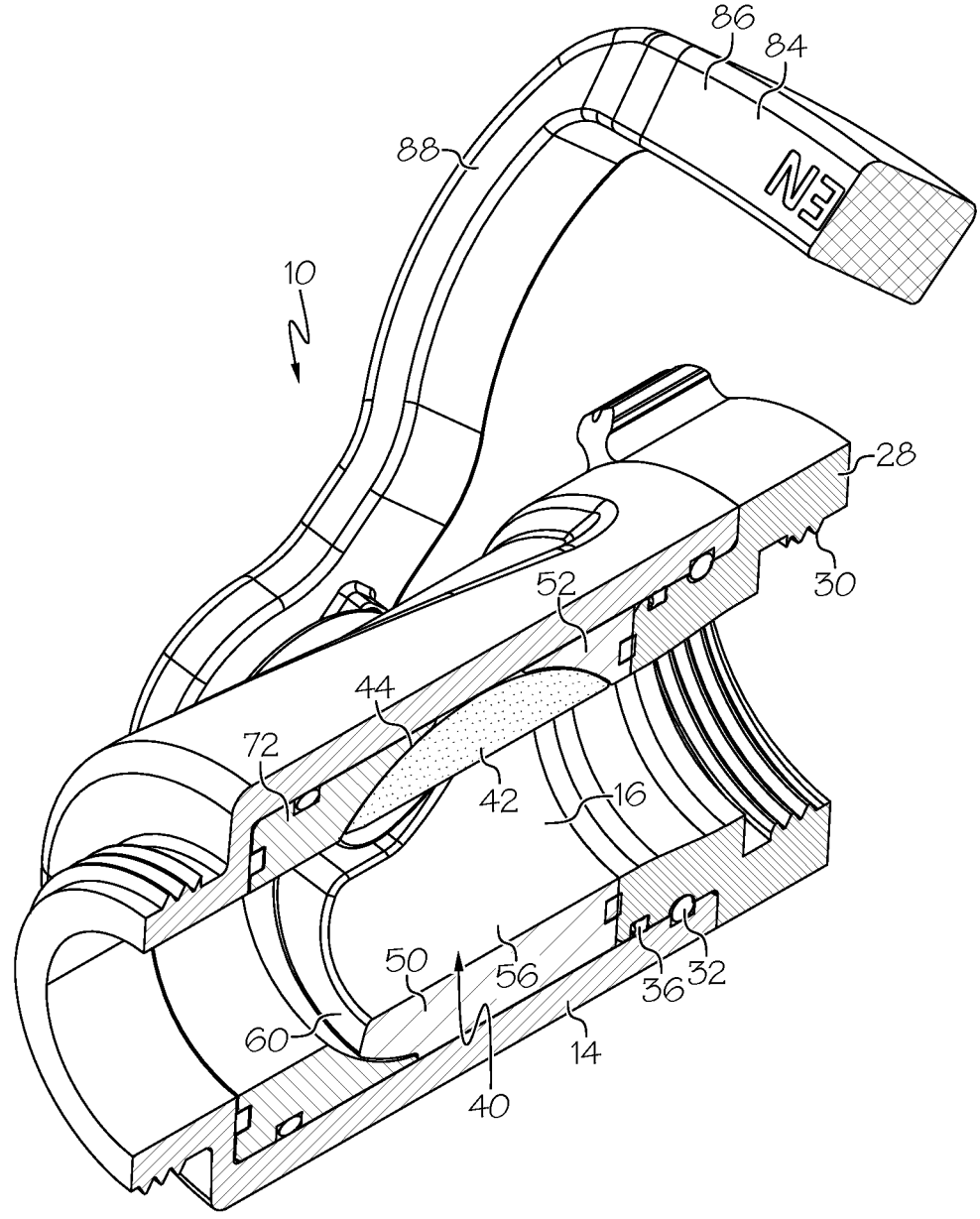
FIG. 5 is a perspective cross section of the component of FIG. 1, in the open position.
Figure 16:
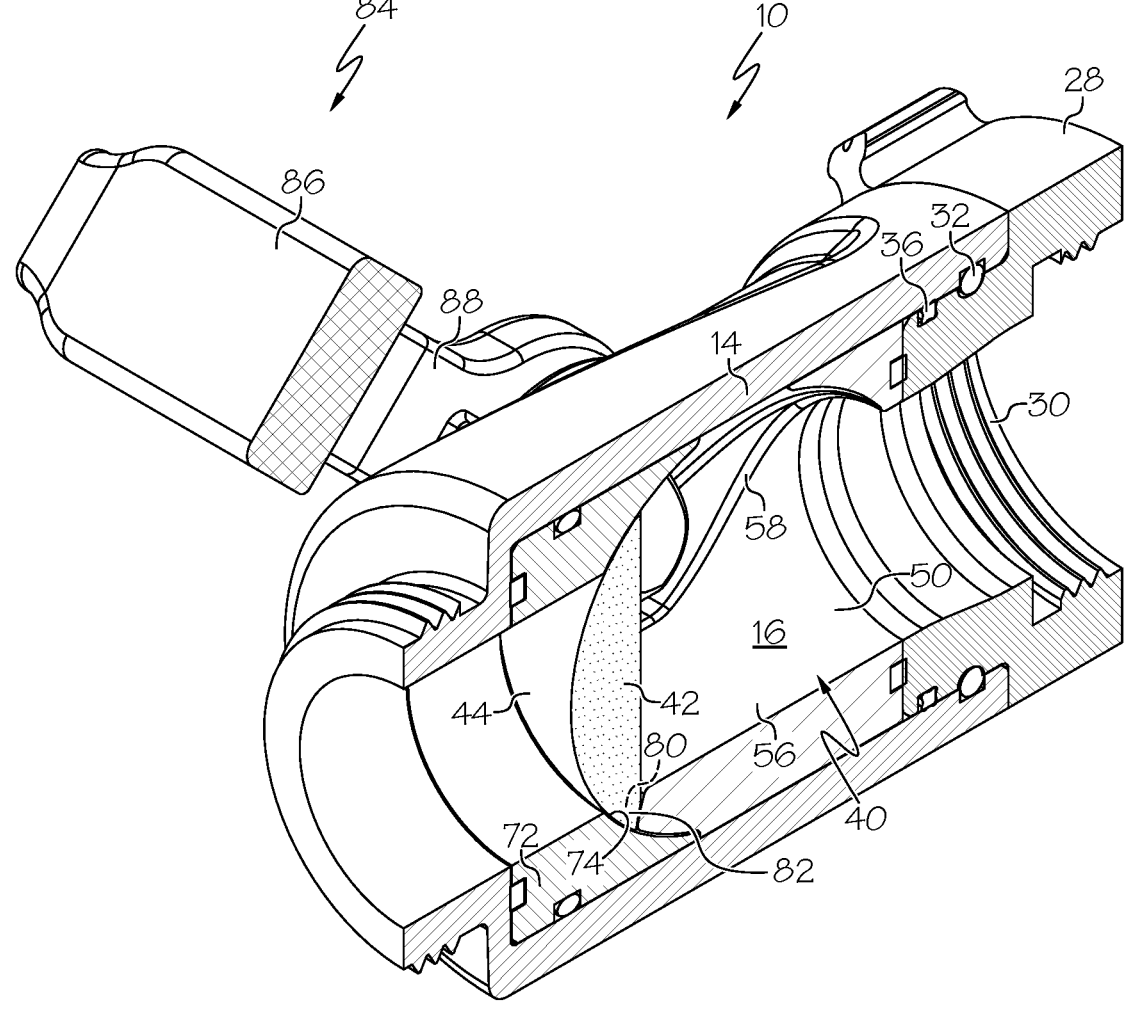
FIG. 16 is a perspective view of the component of FIG. 15.
Figure 17:
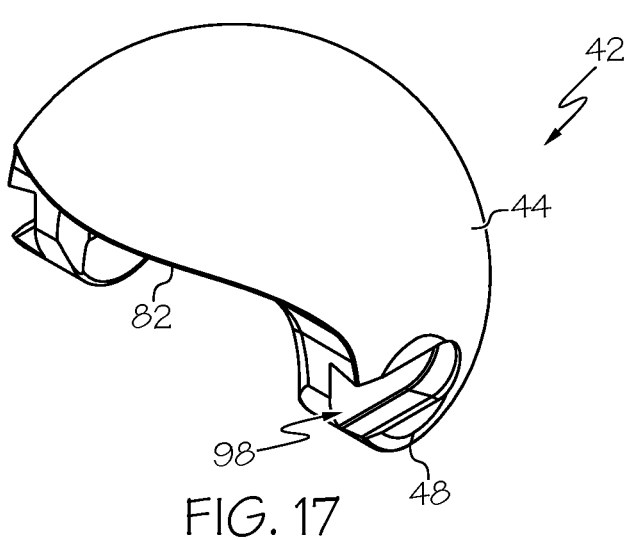
FIG. 17 is a perspective view of the blocking component of the component of FIG. 1.
Figure 18:
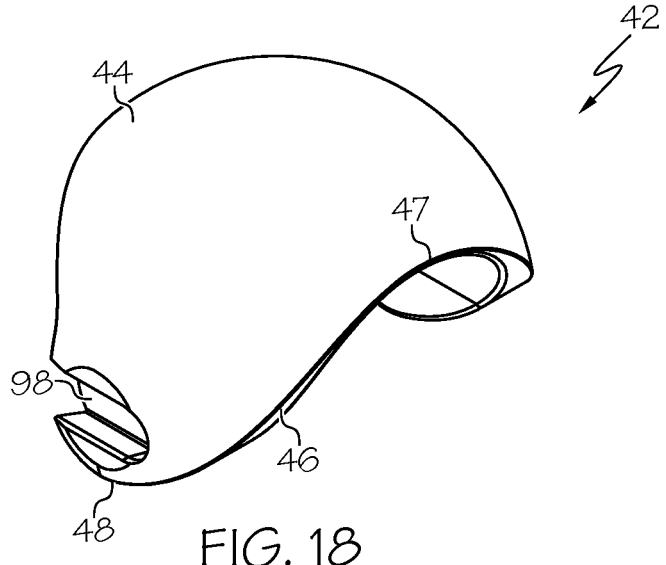
FIG. 18 is another perspective view of the blocking component of the component of FIG. 1.
Figure 19:
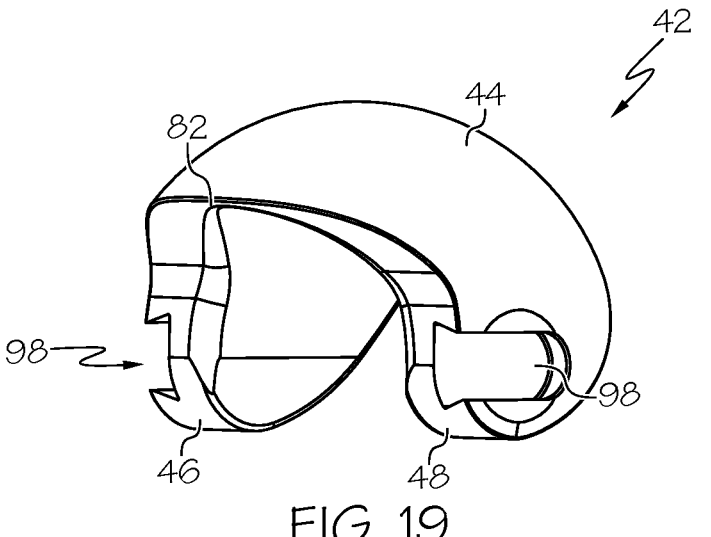
FIG. 19 is another perspective view of the blocking component of the component of FIG. 1.
Figure 25:
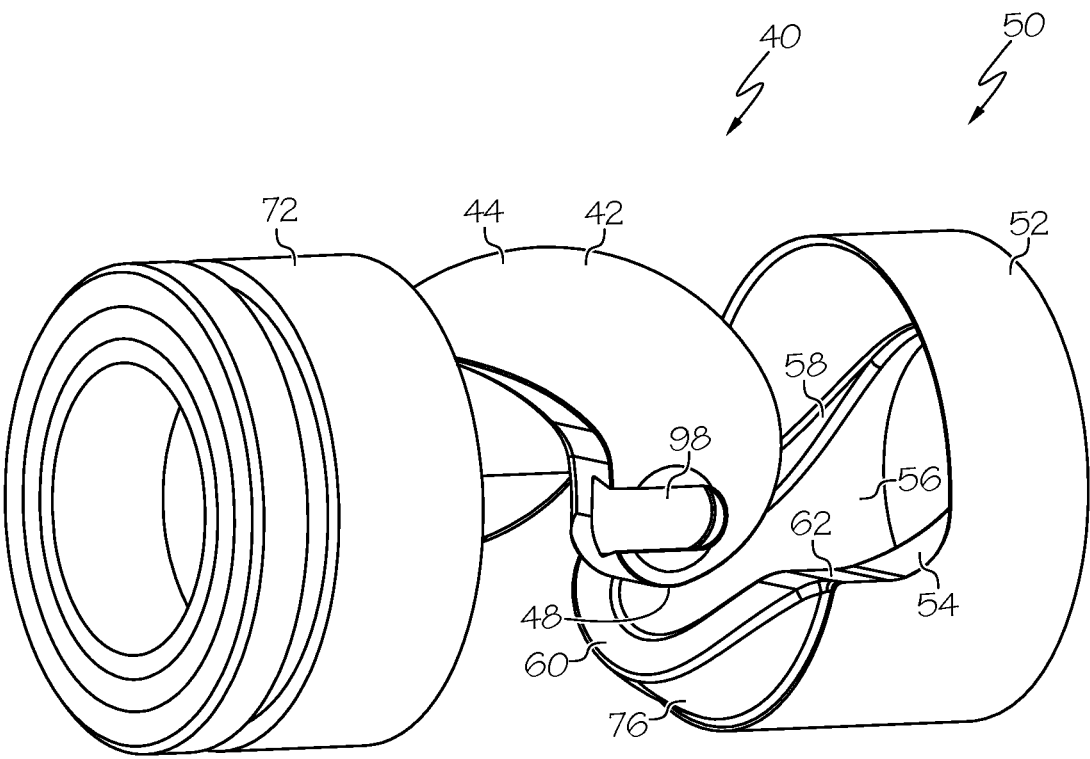
FIG. 25 is a perspective view showing the blocking component, inlet seat and outlet seat in an aligned but exploded configuration.

The component 10/valve 40 can include an outlet seat 72 (FIG. 25) positioned generally downstream of the blocking component 42 and positioned adjacent to and/or in contact with the blocking component 42 in some cases. In particular the outlet seat 72 can extend generally circumferentially about the flow path 16, and the blocking component 42 is configured to sealingly engage the outlet seat 72 when the blocking component 42 is in the closed position, as shown in FIGS. 15 and 16. Stated differently, the blocking component 42 is configured to sealingly engage the outlet seat 72 about a perimeter of the flow path 16 when the blocking component 42 is in the closed position. Conversely the blocking component 42 is configured to be spaced away from, and not sealingly engage (and/or not extend radially inwardly of), the outlet seat 72 when the blocking component 42 is in the open position as shown in FIGS. 5 and 6. The outlet seat 72 can include an inner surface 74 that is spherical or generally spherical to closely/sealingly receive the outer surface 44 of the blocking component 42 therein when the valve 40/blocking component 42 is in the closed position, as shown in FIGS. 15 and 16.

The inlet seat 50 and the outlet seat 72 can be in contact with each other, in one case along the lower portions thereof, as shown for example in FIG. 24. This contact enables fluid to be smooth guided to, and handed-off to, the inlet seat 50 from the outlet seat 72, with no gap therebetween to thereby reduce eddies and introduced turbulence. In the illustrated embodiment the inlet seat 50 and outlet seat 72 are each a unitary, seamless one-piece component, but if desired the inlet seat 50 and/or outlet seat 72 can comprise multiple parts/components.

With reference to FIG. 24, the inlet seat 50 can include an undercut 76 on its radially outer, downstream edge. The undercut 76 is sized and configured to closely receive a correspondingly-shaped radially outer, upstream edge 78 of the outlet seat 72 therein, as shown for example in FIG. 10, to provide a smooth connection therebetween and reduce turbulence of fluid exiting the valve 40. In addition, the inlet seat 50 and/or outlet seat 72 can each include a recess 80, or together form the recess 80, positioned at a downstream portion of the inlet seat 50 and an upstream portion of the outlet seat 72. The recess 80 is configured to receive a leading edge 82 of the blocking component 42 therein when the blocking component 42 is in the closed position, as shown in FIGS. 15 and 16. The inlet 50 and/or outlet 72 seats can be made of a variety of materials, and in one case are made of a relatively rigid polymer such as PTFE or HDPE.

Figure 26:
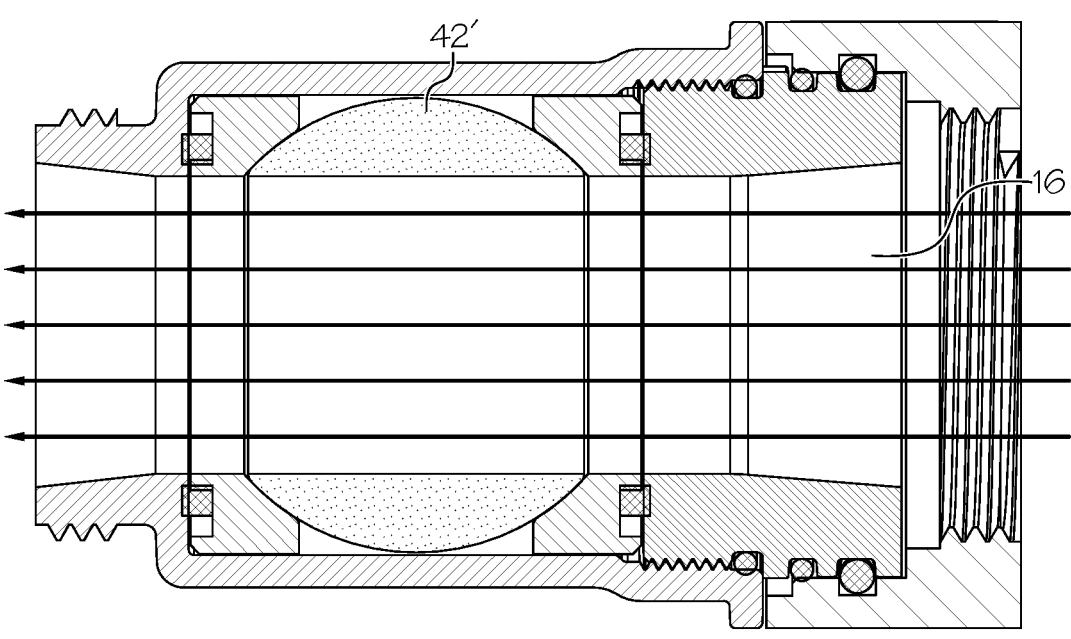
FIG. 26 is a side cross section of a conventional ball valve and conventional ball valve seat in the open position.
Figure 27:
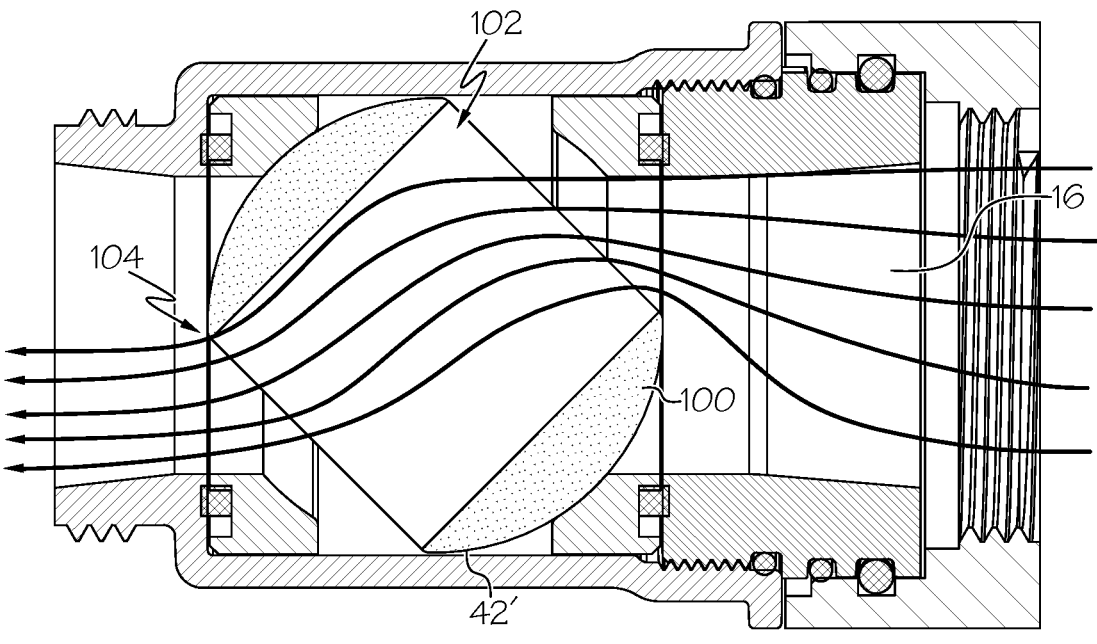
FIG. 27 shows the ball valve of FIG. 26 in a partially closed position.
Figure 28:
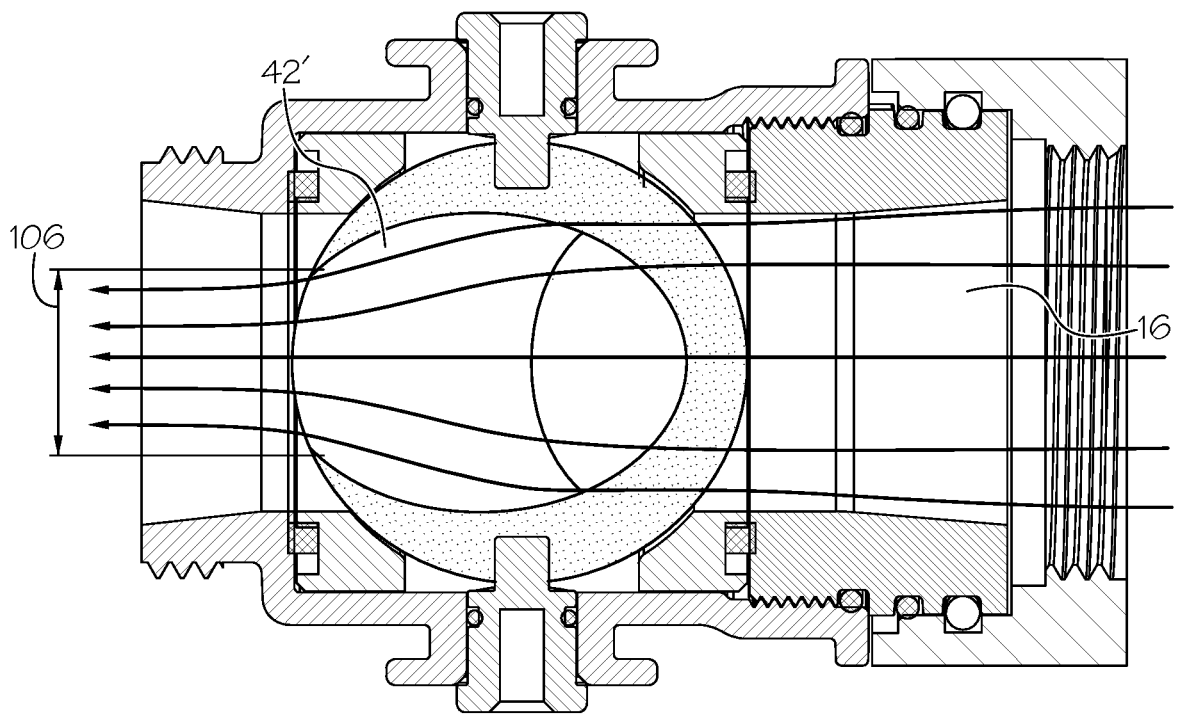
FIG. 28 is a top cross section of the component of FIG. 27.

In some conventional ball valve shutoff systems, as shown in FIGS. 26-28, a valve using a complete ball 42', in one case having a surface/line that extends continuously 360 degrees around the ball 42', could be utilized, where the ball 42' for example includes a cylindrical inner opening formed therein. FIG. 26 shows such a ball 42' when the valve is open. When such a ball valve 42' is in a partially closed position as shown in FIG. 27, a lower portion 100 of the ball 42' protrudes into the flow path 16, providing a blunt protrusion that causes rapid deceleration of fluid. In addition, flow adjacent to the upper region of the ball 42' experiences a sharp change in direction in region 102. The fluid then enters an area of relatively large cross sectional area at a sharp transition 104, leading to voids in the flow and further inefficiencies. Finally, as shown in FIG. 28, when such a ball 42' is partially closed, the effective width 106 of the flow is reduced in top view, providing yet another restriction to fluid flow. Thus, such ball valves can provide relatively poor performance when the ball 42' is in the partially closed position, providing relatively poor metering or throttling. This issue can be particularly problematic in firefighting nozzles, since the ball 42' is located relatively close to the exit of the component 10/nozzle 12, and the flow does not have sufficient time/distance to allow introduced instabilities to reduce or resolve.

Figure 11:
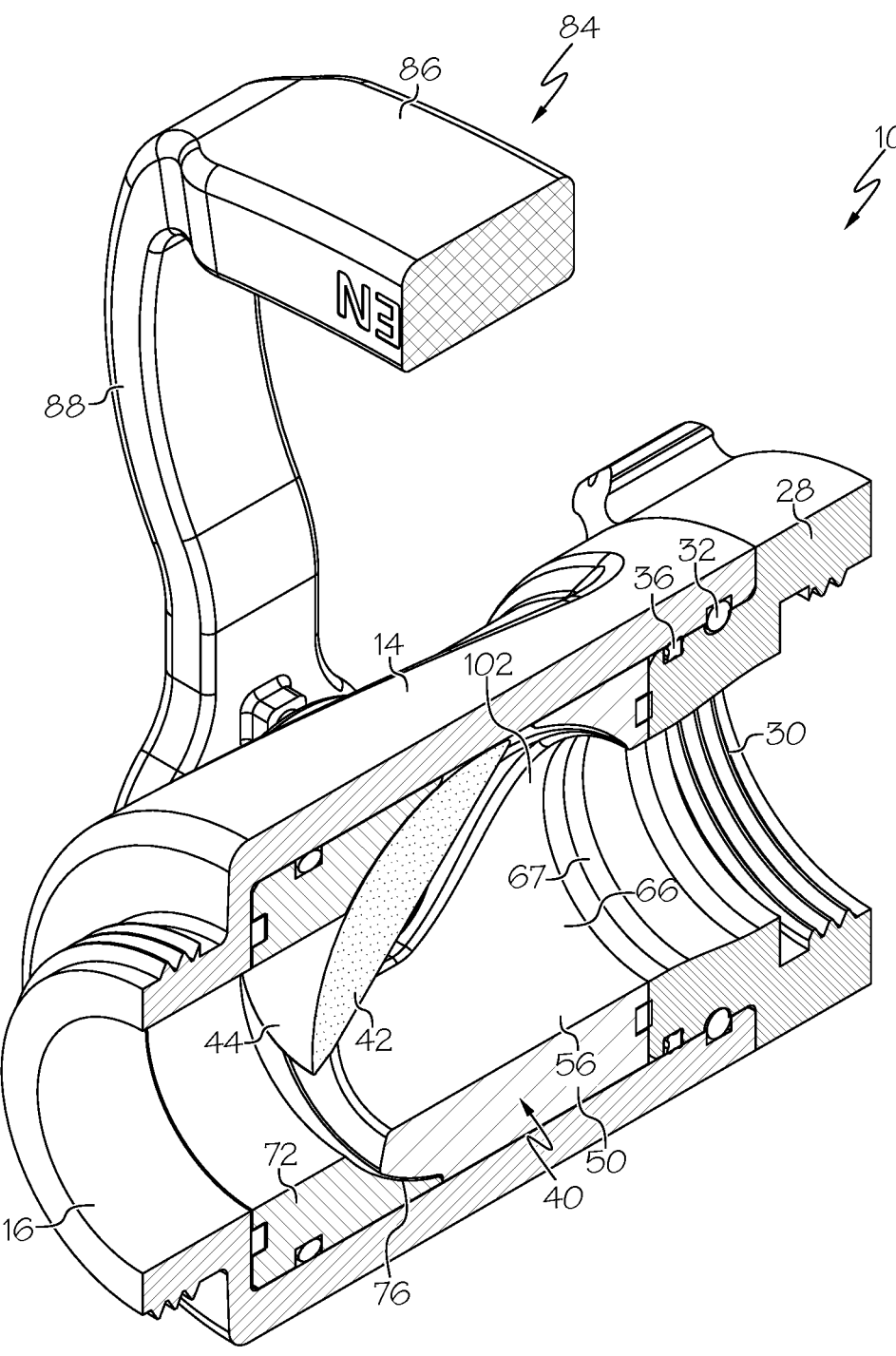
FIG. 11 is a perspective view of the component of FIG. 10.
Figure 12:
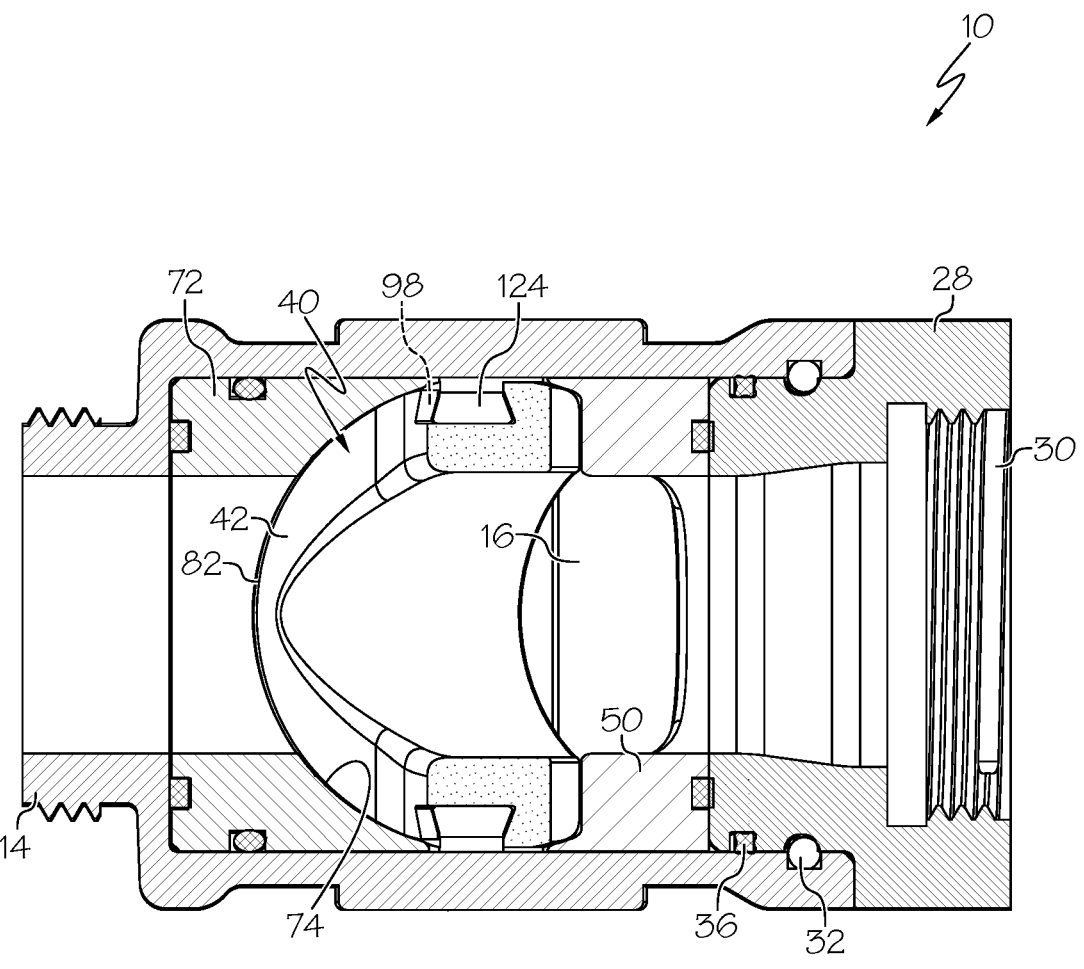
FIG. 12 is a top cross section of the component of FIG. 10.
Figure 13:
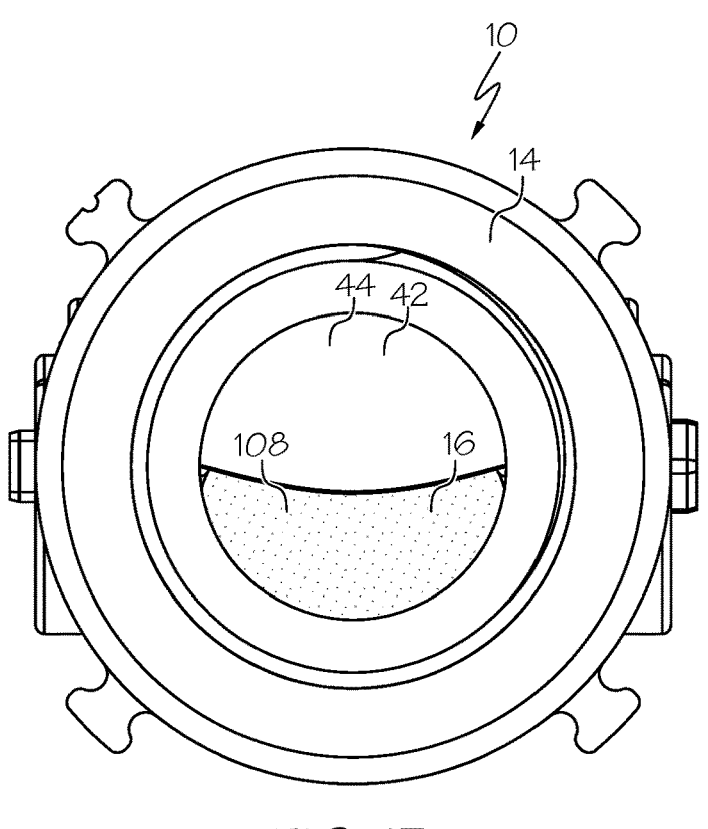
FIG. 13 is an end view of the component of FIG. 1, in the partially closed position.
Figure 14:
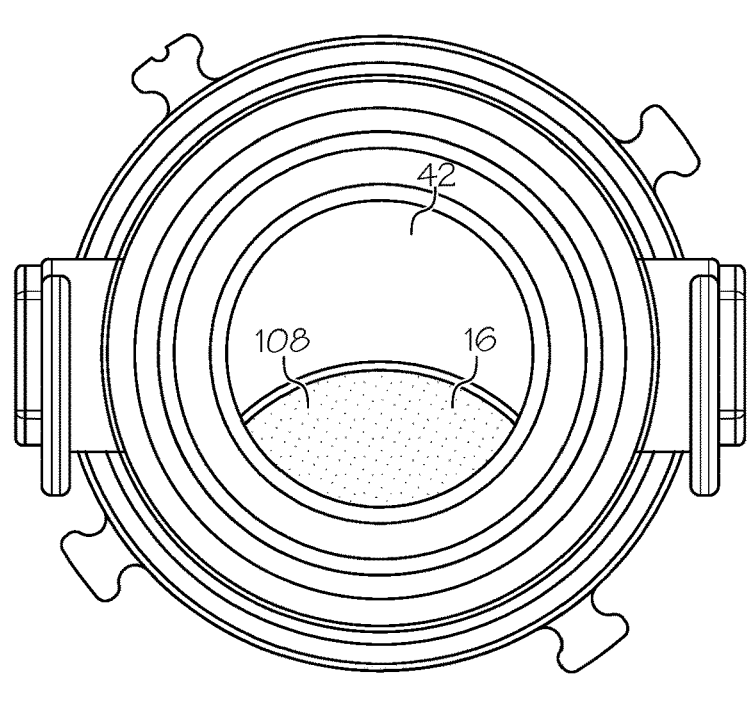
FIG. 14 is an end view of a component with a conventional ball valve and seat, in the partially closed position.

In contrast, as shown in FIGS. 10-12, when the valve 40/blocking component 42 is in the partially closed position, as noted above the upstream end 66 of the an inner surface 56 of the inlet seat 50 is aligned with the portion 67 of the flow path 16/body 14 located immediately upstream of the inlet seat 50, and there is no protruding lower portion of the blocking component 42. In this manner fluid flowing into the lower portion of valve 40/blocking component 42, when the valve 40/blocking component 42 is in the partially closed position, flows smoothly into the valve 40/inlet seat 50/blocking component 42, and the component 10 lacks any structure corresponding to the blunt protrusion 100 of FIG. 27. In addition, flow exiting the blocking component 42 in the embodiment of FIGS. 10-12 experiences a relatively mild transition in region 102 as compared to the region 102 of the embodiment of FIG. 27, since the fluid has a lesser velocity component in the "vertical" direction due to the nature of the associated portion of the inlet seat 50. In addition, as shown in FIG. 13, fluid exits the valve 40/blocking component 42 through area 108, and area 108 extends a greater extent in the circumferential direction along the body 14 than fluid exiting the analogous area 108 of a conventional valve 40/blocking component 42 shown in FIG. 14. This additional circumferential extent of flow provides a more uniform flow of fluid.

In addition the blocking component 42 is configured to provide relatively little or no narrowing at the outlet of the blocking component 42 in region 106 as shown in FIG. 12, as compared to the narrowing at region 106 in blocking component 42' as shown in FIG. 28. The blocking component 42 thereby allows flow across the full width of the valve 40 when in the partially closed position. In other words, a size/dimension of the flow path 16 through the valve 40/blocking component 42 in at least one dimension (the horizontal dimension in the illustrated case, oriented perpendicular to the central axis A) is the same (or in one case has a cross sectional area within 90%) when the valve 40/blocking component 42 is in the partially closed position as compared to when the valve 40/blocking component 42 is in the open position. Finally the swept inlet edge reduces the tendency for the flow to separate caused by the sharp inlet edge of the ball of the embodiment of FIG. 26-28.

When the valve 40/blocking component 42 is in the closed position as shown in FIGS. 15 and 16, the valve 40/blocking component 42 can engage the outlet seat 72 about an entire perimeter of the outlet seat 72. The blocking component 42 thus provides a good seal when in the closed position, but when in the partially closed position the blocking component 42 reduces or eliminates turbulence created by a blunt inlet side of a conventional ball projecting into the flow path 16.

Figures 29, 30:
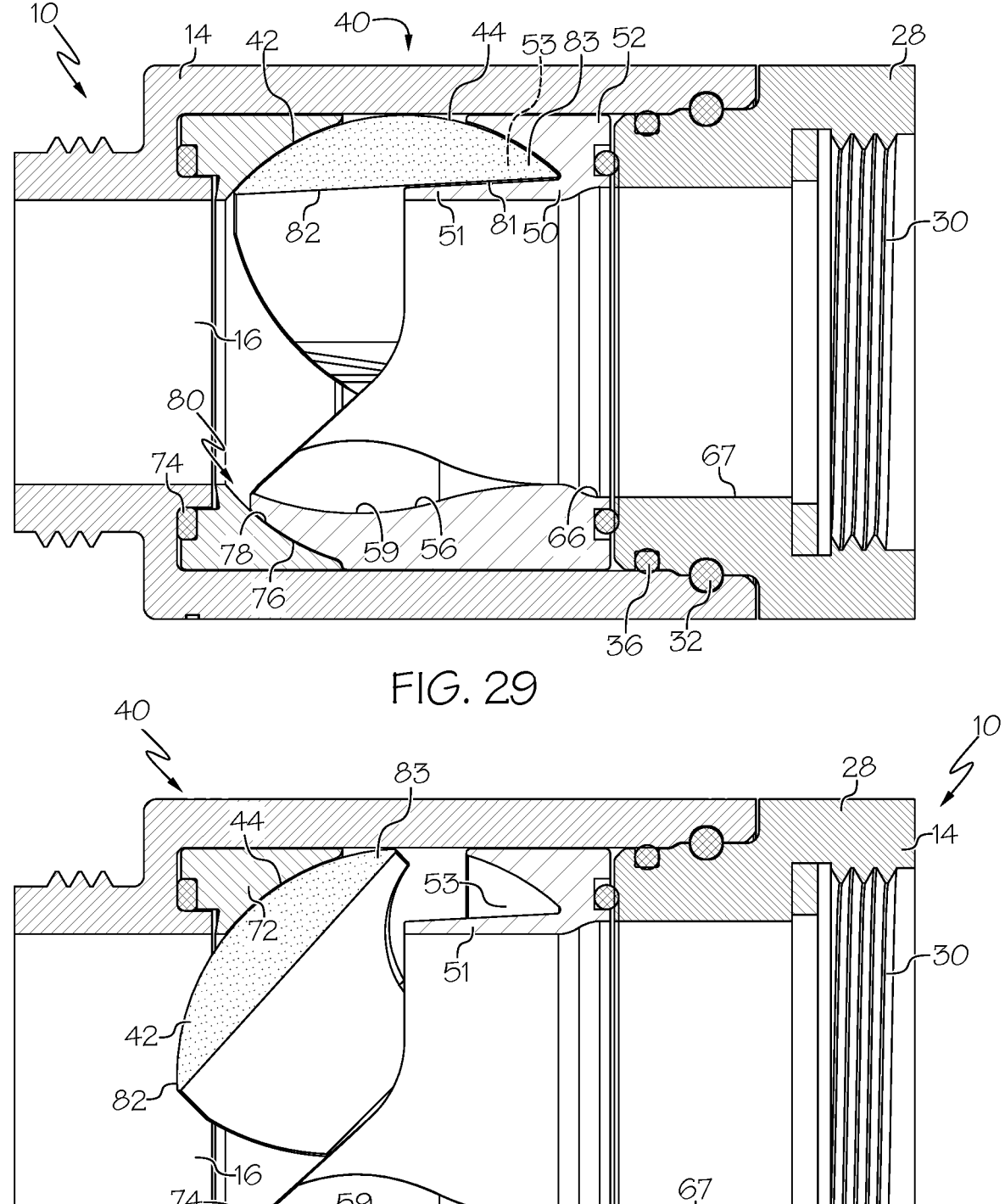
FIG. 29 is an alternate embodiment of the component of FIG. 6.
FIG. 30 is a side cross section of the component of FIG. 29, in a partially closed position.

With reference to FIG. 29, in an alternate embodiment of the component 10/valve 40, the inlet seat 50 includes a generally annular/cylindrical shielding section 51 that is, in one case, concentrically positioned radially inside the outer cylindrical base portion 52. When the blocking component 42 is in the open position, as shown in FIG. 29, the radially inner surface 81 of the trailing edge 83 of the blocking component 42 is positioned adjacent to and in contact with, and aligned with, the radially outer surface of the shielding section 51. The opposite, radially inner surface of the shielding section 51 defines part of the flow path 16.

When the component 10/valve 40/blocking component 42 is in a partially closed position, as shown in FIG. 30, the shielding section 51 blocks fluid from directly flowing into the somewhat closed cavity 53 vacated by the upstream end (trailing edge 83) of the blocking component 42, which thereby reduces eddies and turbulent flow, and ensures a smoother flow of fluid through the component 10/valve 40. In addition, the shielding section 51 helps to reduce and/or block fluid from impinging on the upstream radially outer portion (trailing edge 83) of the blocking component 42 when the blocking component 42 is in its partially closed position, which can help to prevent inadvertent closing of the blocking component 42.

Figure 31:
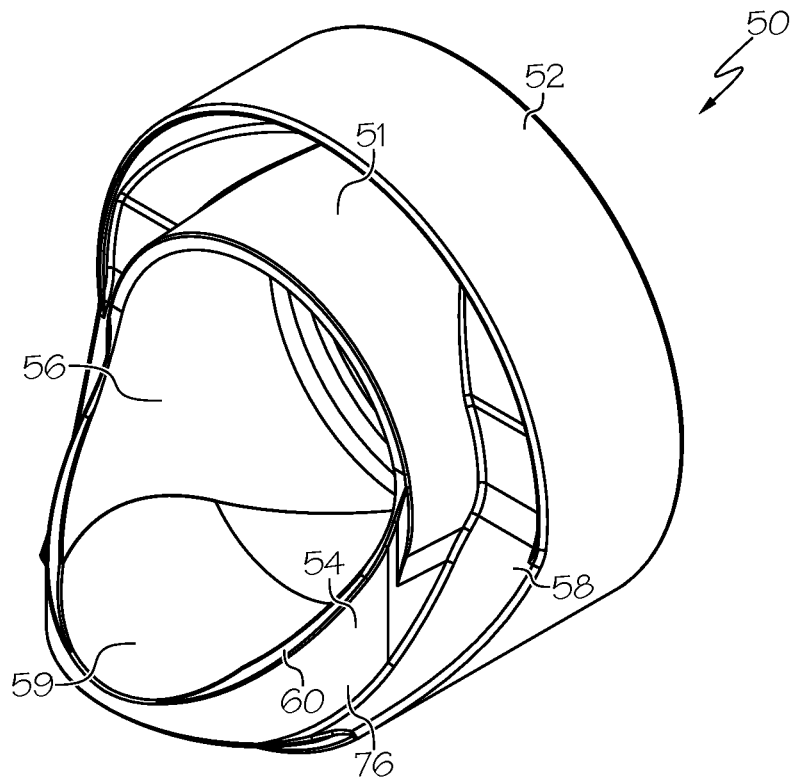
FIG. 31 is a perspective view of the inlet seat of the component of FIG. 29.

The shielding section 51 can extend axially at least about 20% of a radius of the blocking component 42 in one case, and at least about 30% of the radius of the blocking component 42 in another case. As shown in FIG. 31, the shielding section 51 may not extend 360 degrees around the inlet seat 50, but in one case extends at least about 90 degrees about the inlet seat 50/central axis A, and in another case at least about 180 degrees about the inlet seat 50/central axis A.

With reference to FIGS. 29-31, at the opposite end (bottom end, in the illustrated embodiment) the inlet seat 50 can have a recessed area 59, at or in the inner surface 56, generally aligned with the blocking component 42 when the blocking component 42 is in the closed and/or partially closed position. The recessed area 59 is located on an opposite side of the blocking component 42, and can be aligned with a "gap" of the blocking component 42/outer surface 44 (e.g. if the outer surface 44 extends 90 degrees (as shown in FIG. 29), the recessed area 59 can be aligned with the remaining 270 degrees. The recessed area 59 is recessed relative to a straight axial line along the radially inner edge of the inlet seat 50 as shown, for example, in embodiments without the recessed area 59 such as FIGS. 3, 5 and 6.

At least part of the recessed area 59 along its axial length, or at least about 50% thereof, may overlap with the blocking component 42 when the blocking component 42 is in the fully and/or partially closed position. The recessed area 59 may have a maximum depth (extending in the radial direction) of at least about 5% in one case, or at least about 10% in another case, of a radius of the blocking component 42, and may smoothly transition to and from the maximum depth in the flow direction. The recessed area 59 may have a total length of at least about 50% in one case, or at least about 75% in another case, of an effective radius of the blocking component 42 in the location of the recessed area 59.

The recessed area 59 can provide an area of relief to fluid that is flowing in the downstream direction when the blocking component 42 is in the partially closed position as shown in FIG. 30. In particular the blocking component 42 can provide a restriction or area of narrowing when in the partially closed position, which can lead to undesired and/or uncontrolled increase in velocity and/or additional turbulence, the effects of which are ameliorated by the recessed area 59.

Figure 32:
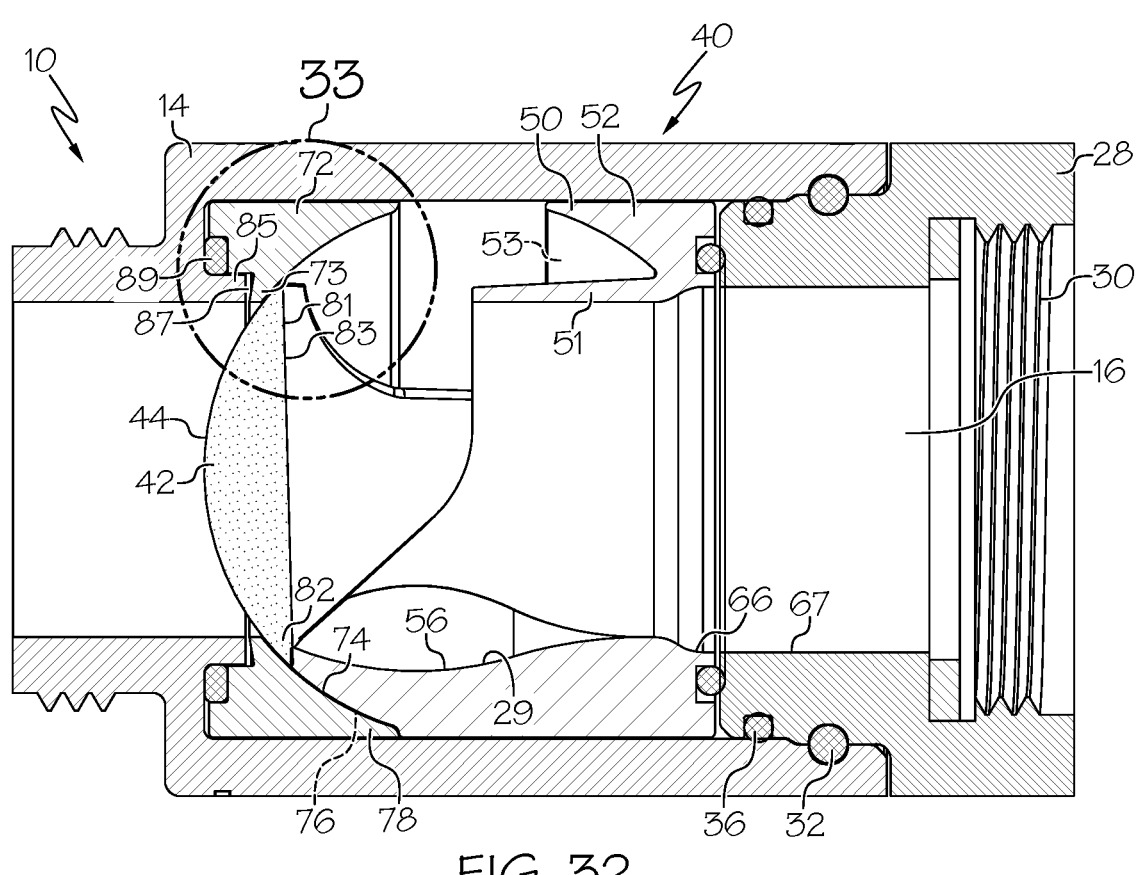
FIG. 32 is another alternate embodiment of the component of FIG. 6.
Figure 33:
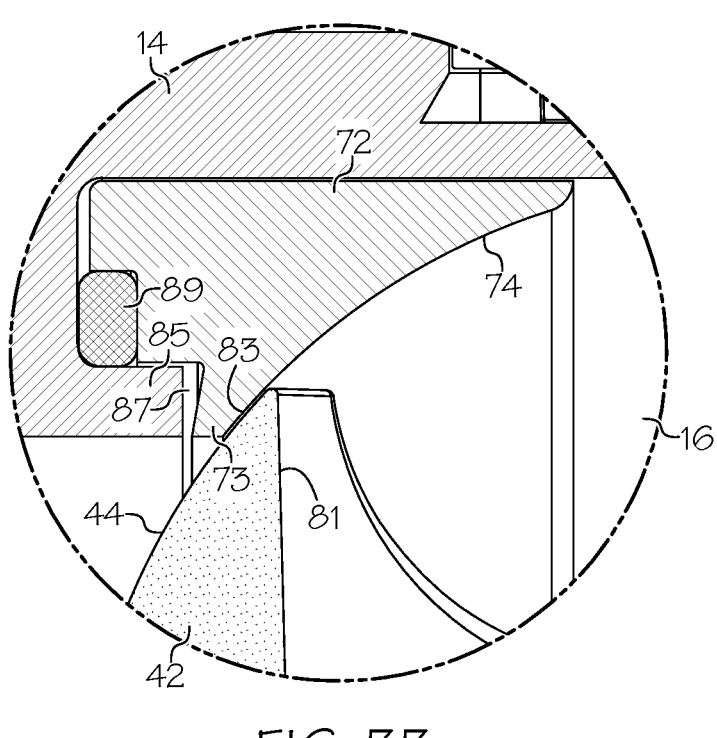
FIG. 33 is a detail view of the area indicated in FIG. 32.

With reference to FIGS. 32 and 33, in one case the outlet seat 72 can have a relatively thin lip 73 at its radially inner edge. The lip 73 can in one case have a maximum thickness (at its base, extending in the axial direction) of less than about 0.1", and a minimum thickness extending the axial direction (at its distal end) of less than about 0.04" or less than about 10% in one case, or less than about 5% in another case, of an effective radius of the blocking component 42. The lip 73 can have a curved inner surface with a radius that matches or generally matches (within about 1% in one case) the radius of the blocking component 42. In this manner, when the blocking component 42 is in its partially closed or fully closed position, as shown in FIGS. 32 and 33, the lip 73 of the outlet seat 72 engages the blocking component 42 at its radially outer surfaces. Since the lip 73 is relatively thin, the lip 73 is deformable/deflectable to accommodate any imperfections on the outer surface 44 of the blocking component 42, while still maintaining a seal with the outer surface 44. As noted above, the outlet seat 72 can be made of a relatively rigid polymer such as PTFE or HDPE, but the lip 73 can be sufficiently thin to enable the desired deformation/deflection.

In the embodiment of FIGS. 32 and 33, the body 14 of the valve 40 can have an axially extending lip 85 positioned radially inside, and adjacent to, the downstream end of the outlet seat 72 and positioned radially inside a seal or O-ring 89 positioned between the outlet seat 72 and the body 14 of the valve 40. The lip 85 is spaced away from the lip 73 to form an axially-extending gap 87 therebetween to enable axial deflection of the lip 73 as outlined above. The lip 85 can have an axial length at least as long as that of the seal/O-ring 89, and helps to retain the seal/O-ring 89 and/or the outlet seat 72 in place when the valve 40 has high pressure fluid flowing therethrough.

Figure 34:
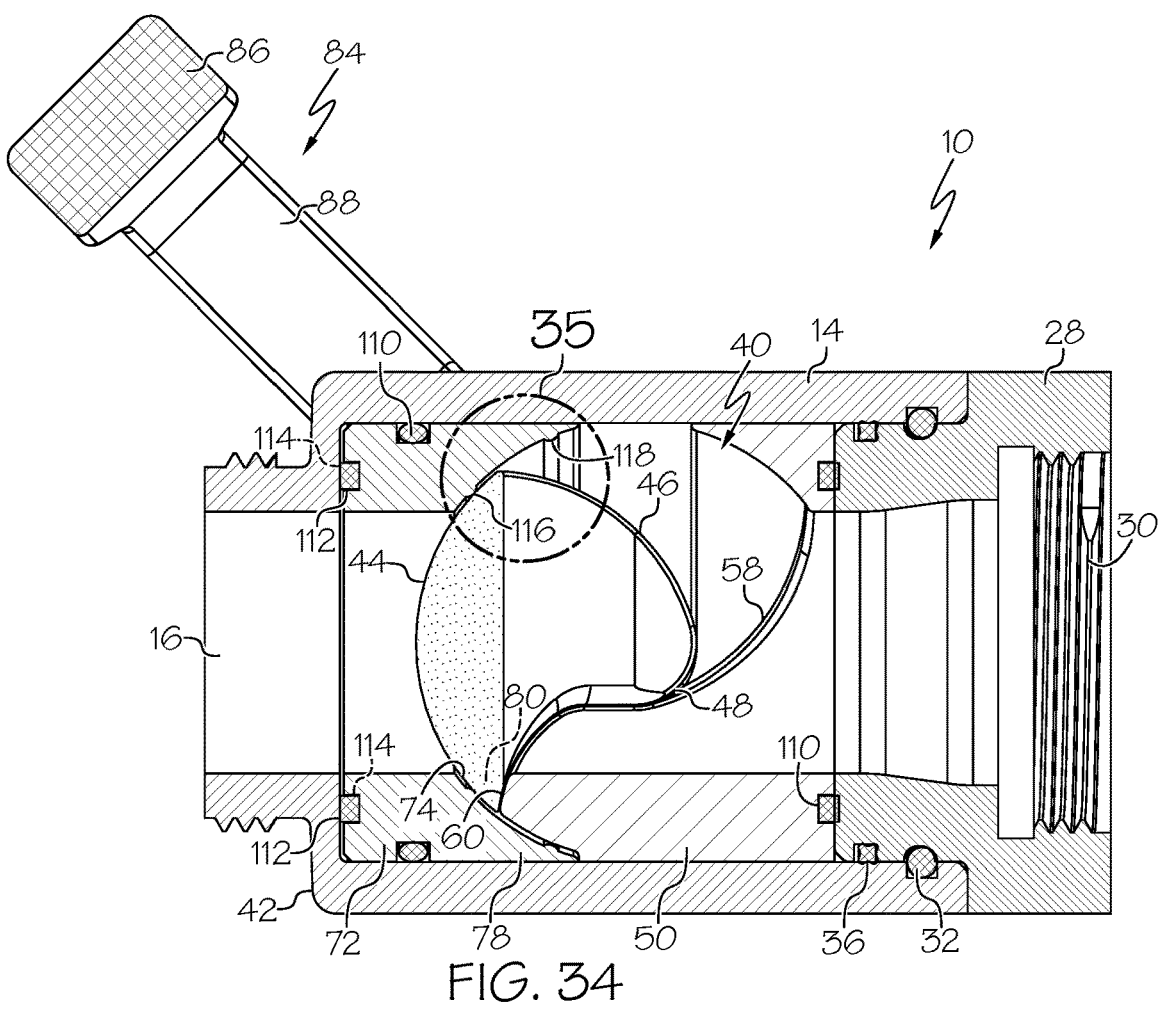
FIG. 34 is a side cross section of an alternate embodiment of the component of FIG. 1.

Many conventional ball valves are designed to be used for flow in either direction, and have identical seats on either side of the ball. In contrast, the component 10 can have inlet 50 and outlet 72 seats that are not identical since the blocking component 42 only needs to seal and block flow when the valve 40/blocking component 42 is in the closed position. However it can be more difficult to form a seal in this configuration since the blocking component 42 does not engage both the inlet seat 50 and the outlet seat 72 when in the closed positions, which in conventional designs can be used to squeeze the blocking component therebetween and into sealing contact with the outlet seat 72. As shown in FIG. 34, the component 10 can include sealing components 110, such as an O-rings, positioned between the body 14 and the inlet 50 and outlet 72 seats, respectively to provide a fluid tight connection therebetween. In addition, an elastically deformable component 112, such as an O-ring, can be positioned in a groove 114 formed in the outlet seat 72 and/or the body 14 of the component 10. The elastically deformable component 112, and all other seals and the like disclosed herein, can be made of a wear-resistant elastomer such as VITON® synthetic rubber sold by The Chemours Company and/or EPDM synthetic rubber, or other materials as desired. The elastically deformable component 112 is thus positioned between the body 14 and the outlet seat 72, and positioned in the groove 114. The elastically deformable component 112 can be sized larger than the groove 114 in at least the axial direction and thus protrude, or be biased to protrude, in the axial direction from the groove 114. The elastically deformable component 112 can thereby urge the outlet seat 72 in an upstream direction, which in turn biases the outlet seat 72 into sealing contact with the blocking component 42 (when the blocking component 42 is closed) to provide a good seal.

Figure 35:
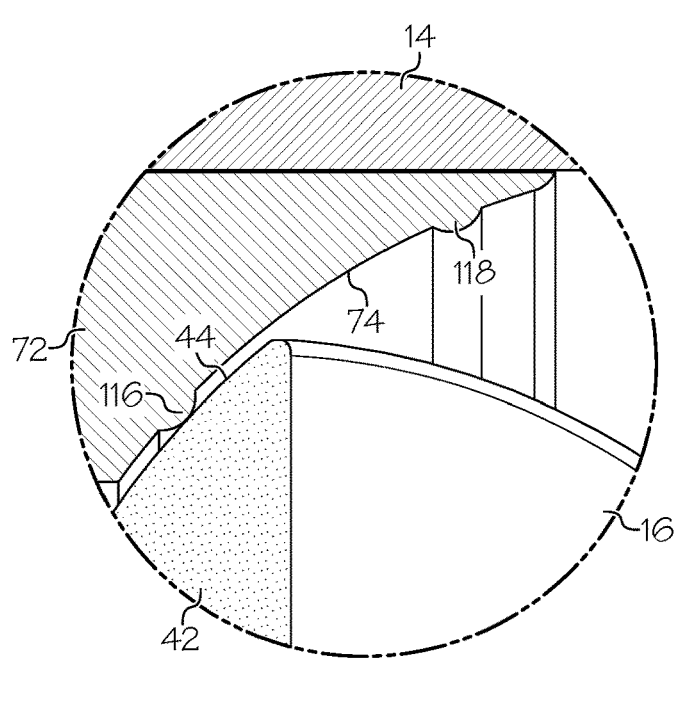
FIG. 35 is detail view of the area indicated in FIG. 34.

As shown in FIGS. 34 and 35, the outlet seat 72 can includes a pair of ribs 116, 118, wherein each rib 116, 118 extends generally circumferentially about the (spherical) inner surface 74 of the outlet seat 72. One of the ribs 116 is configured to sealingly engage the blocking component 42 when the valve 40/blocking component 42 is in the closed position (FIG. 35) and to not engage the valve 40/blocking component 42 when the valve 40/blocking component 42 is in the open position. Conversely the other one of the ribs 118 is configured to sealingly engage the blocking component 42 when the valve 40/blocking component 42 is in the open position and to not engage the valve 40/blocking component 42 when the valve 40/blocking component 42 is in closed position. In one case both ribs 116, 118 are configured to sealingly engage the blocking component 42 when the valve 40/blocking component 42 is in the partially closed position.

The protruding ribs 116, 118 can reduce the force required to form a seal with the blocking component 42, as the sealing force/unit area is larger when the ribs 116, 118 are utilized (e.g. the ribs 116, 118 provide a line of contact as opposed to a surface contact). The protruding ribs 116, 118 can also ensure that a seal is more predictably formed, since attempting to form a seal with two purely spherical surfaces (e.g. a surface seal) can be more easily compromised by imperfections in the mating spherical surfaces.

Figure 36:
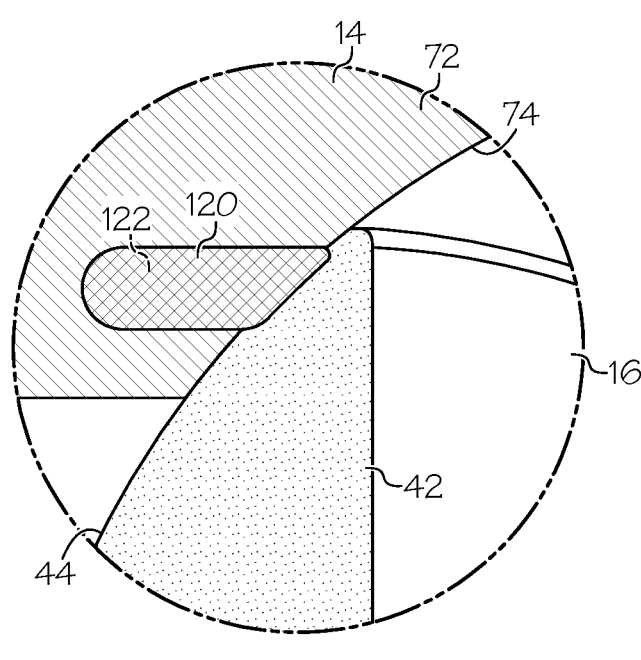
FIG. 36 is an alternate detail view of the area indicated in FIG. 34.
Figure 37:
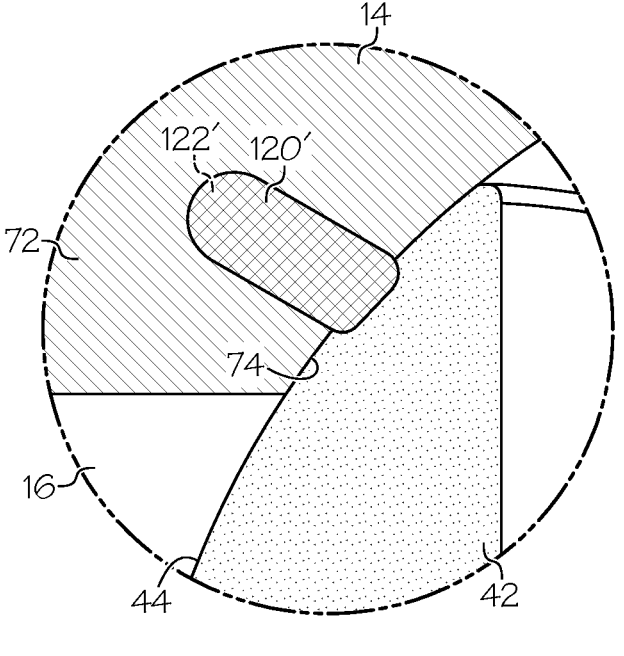
FIG. 37 is another alternate detail view of the area indicated in FIG. 34.

As shown in FIG. 35, instead of or in addition to using the ribs 116, 118, an elastically deformable component 120, such as a seal or O-ring, can be received in a groove 122 formed in the inner surface 74 of the outlet seat 72. The seal 120 can protrude, or be biased to protrude, in the axially upstream direction from the groove 122 to form a seal with the blocking component 42, when the valve 40/blocking component 42 is in the closed position. In the embodiment of FIG. 36, the groove 122/seal 120 is axially aligned, and thus parallel to, the central axis A of the component 10. If desired, as shown in the embodiment of FIG. 37, the groove 122/seal 120 is not axially aligned, and the seal 120 (or its radially outer and/or inner surfaces) and the groove 122 is formed at an angle relative to the central axis A. In particular the groove 122/seal 120 can be positioned at a radially inwardly-extending angle moving in upstream direction. This positioning of the groove 122/seal 120 can help the elastically deformable component 120 resist removable from the groove 122 due to fluid pressure and/or swiping movement of the blocking component 42.

Figure 4:
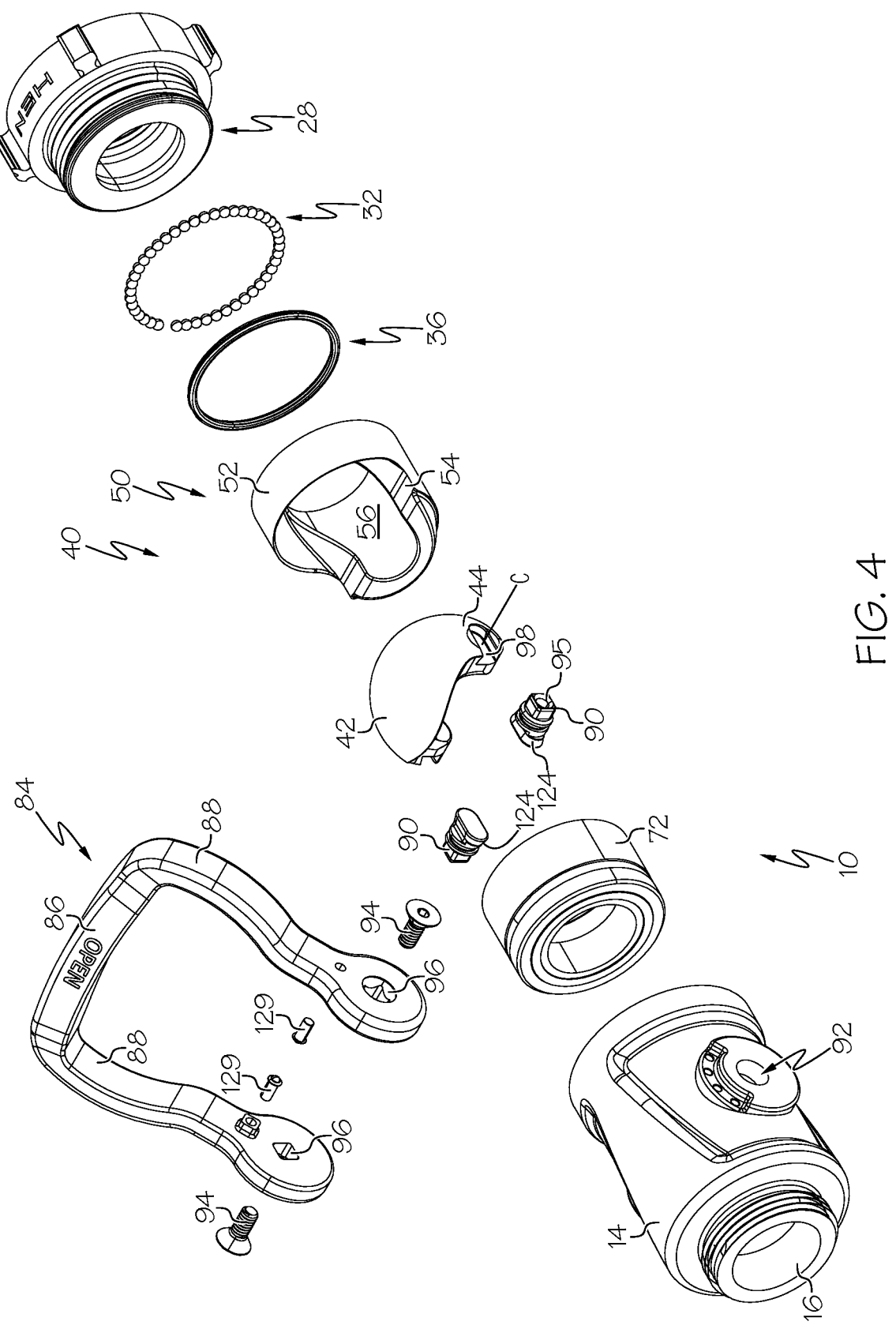
FIG. 4 is an exploded perspective view of the component of FIG. 1.

With reference to FIG. 1, the component 10/shutoff valve 40 can include a valve actuator 84 that is manually operable to move the valve 40/blocking component 42 between the open, closed, and partially closed positions. The valve actuator 84 includes a gripping arm 86 oriented generally transverse to the central axis A/length of the body 14/flow path 16. The valve actuator 84 includes two legs 88, each leg 88 extending from an opposing end of the gripping arm 86 to opposite outer locations on the body 14. With reference to FIG. 4, each leg 88 of the valve actuator 84 is coupled to an associated stem 90 that extends through an associated opening 92 in the body 14. A seal (not shown) can be positioned about each stem 90 to ensure the stem 90 passes through the component body 14 in a sealed manner. Each leg 88 of the valve actuator 84 can be coupled to the associated stem 90 by a fastener 94 extending through an opening 96 of leg 88 and into an opening 95 of each stem 90.

Each stem 90 rotationally engages and/or is rotationally coupled to the blocking component 42, at a centerline of the blocking component 42 (e.g. a center of a radius of the spherical outer surface 44), which defines the axis of rotation C for the blocking component 42/actuator 84. In the illustrated embodiment, a distal end of each stem 90 is received in a correspondingly sized and shaped, axially-extending groove or recess 98 in the blocking component 42, as will be described in greater detail below. In this manner the actuator 84 is pivotable about the axis C extending through the valve 40 and through the flow path 16 to thereby move the valve 40/blocking component 42 between the open and closed positions.

The actuator 84 can move between a forwardly-inclined position, shown in FIGS. 15, 16, 34 and 40 where the valve 40/blocking component 42 is in the closed position, and a rearwardly-inclined position, as shown in FIGS. 1-3, 5, 6, 41 and 42, where the valve 40/blocking component 42 is in the open position. The valve actuator 84 and/or blocking component 42 may pivot about ninety degrees when moving the valve 40/blocking component 42 between the open and closed positions, and the actuator 84 may include a pair of stops that engage corresponding stops (not shown) on the body 14 to limit the range of pivoting motion of the valve actuator 84/valve 40/blocking component 42.

Figure 38:
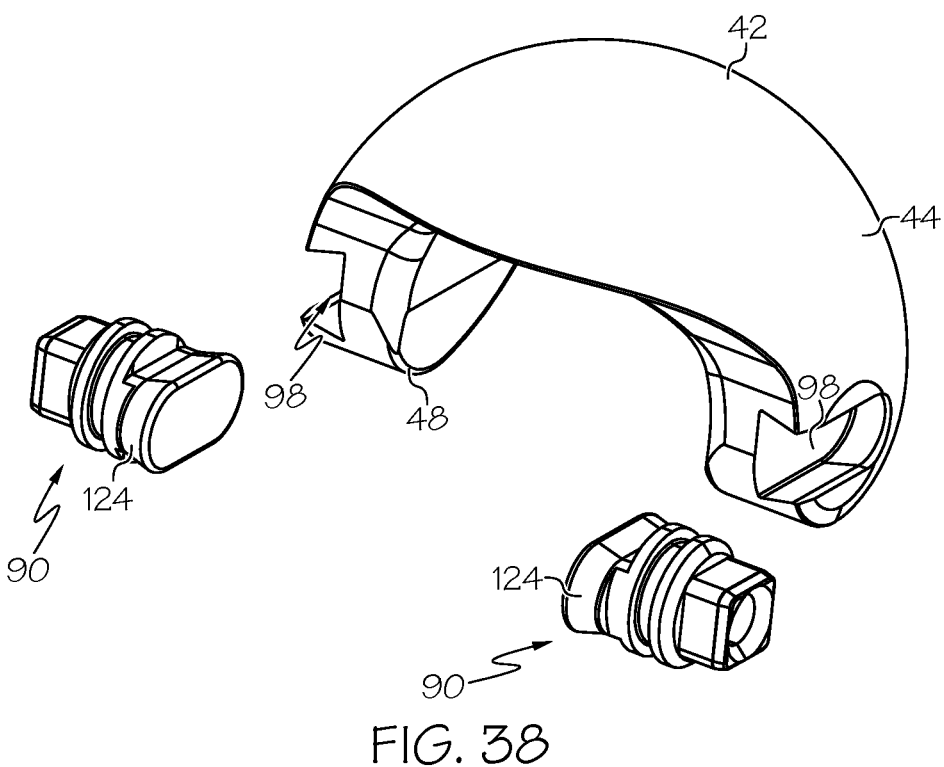
FIG. 38 is a detail view of the stems and blocking component of the component of FIG. 1.
Figure 39:
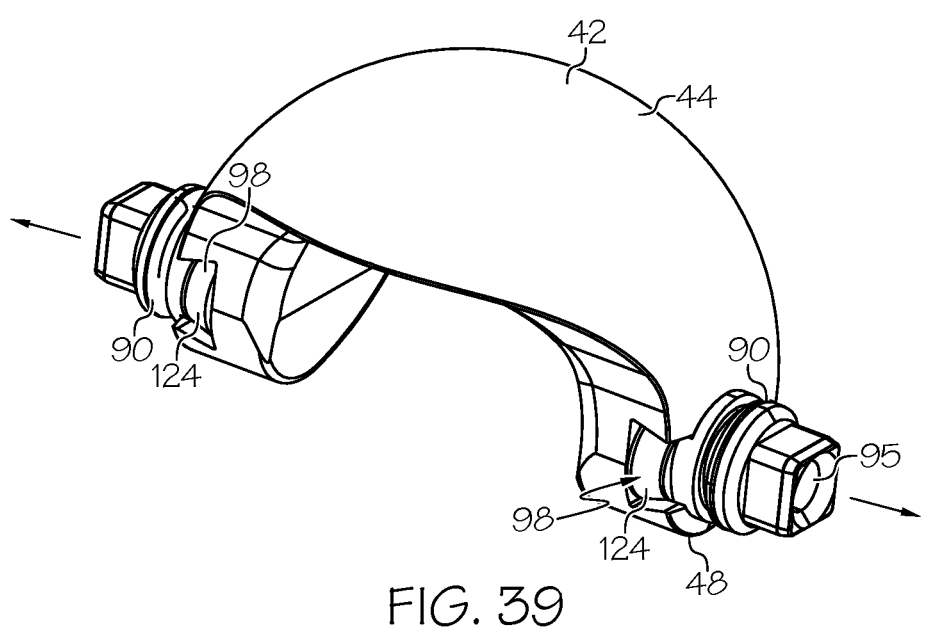
FIG. 39 show the components of FIG. 38 with the stems slid into grooves on the blocking component.

With reference to FIGS. 38 and 39, each stem 90 can include a male dovetail shaped component 124 on its radial inner surface, that is configured to be slidably received (in the axial direction) in a corresponding groove 98 (e.g. a female dovetail-shaped component). As can be seen, the blocking component 42 can include two grooves 98, where the grooves 98 are positioned on opposite sides of the blocking component 42. In one embodiment, each male component 124 is sized to be smaller than the associated groove 98 in both the pivot direction (parallel to the center/pivot axis C of the blocking component 42) and the vertical direction (oriented perpendicular to the pivot direction C and the central axis A of the body 14). In one case each tolerance/gap in each direction can vary between about 0.001" and about 1" in one case, and between about 0.001" and about 0.01" in another case.

The tolerance between the male component 124 and the female component or groove 98 increases case of assembly, since alignment of the male 124 and female 98 components, and passing the fastener 94 through openings 96 of the actuator 84 and the openings 95 of the stems 90, can be difficult. The increased spacing/tolerance enables the stems 90 to move in two different directions to provide increased range of motion and easier coupling to the fasteners 94. When the fasteners 94 are tightened down, the stems 90/male components 124 are pulled tight against the groove 98, as shown by the arrows in FIG. 39, and held in place by frictional forces between the angled/dovetail surfaces.

Thus in this configuration the gaps/tolerances between the male components 124 and female component 98, in both dimensions, is effectively removed upon assembly. This ensures that movement of the actuator 84 is smoothly and directly translated to movement of the blocking component 42. Moreover it should be understood that the positioning of the male 124 and female 98 components could be reversed; that is, the female component 98 (dovetail groove/slots) can be located on the stems 90 and the male dovetail component 124 could be located on the blocking component 42. Thus each stem 90 can be coupled to the blocking component 42 by a dovetail connection, wherein each dovetail connection includes a male 124 and a female component 98, and wherein each dovetail connection is configured to be pulled tight when each dovetail connection is coupled to the actuator 84.

In one case the actuator 84 and body 14 are configured such that the actuator 84 can be releasably secured in place when in a partially closed position and/or provide tactile feedback to a user when the actuator 84 is sufficiently manually moved. For example, with reference to FIG. 1, the body 14 can include a series of circumferentially spaced recesses 128 positioned adjacent to the actuator 84, and more particularly the base end of the legs 88. Each recess 128 can be sized and positioned to receive a male protrusion, such as the ball of a spring-loaded ball plunger 129 (FIG. 4), located on the actuator 84, that can closely fit into, or "snap" into, an associated one of the recesses 128. Of course, if desired the positioning of the recesses 128 and protrusions 129 can be reversed such that a recess 128 is positioned on the actuator 84 and a plurality of circumferentially-spaced protrusions 129 are positioned on the body 14.

US 12,560,246 B2

13

Figure 40:
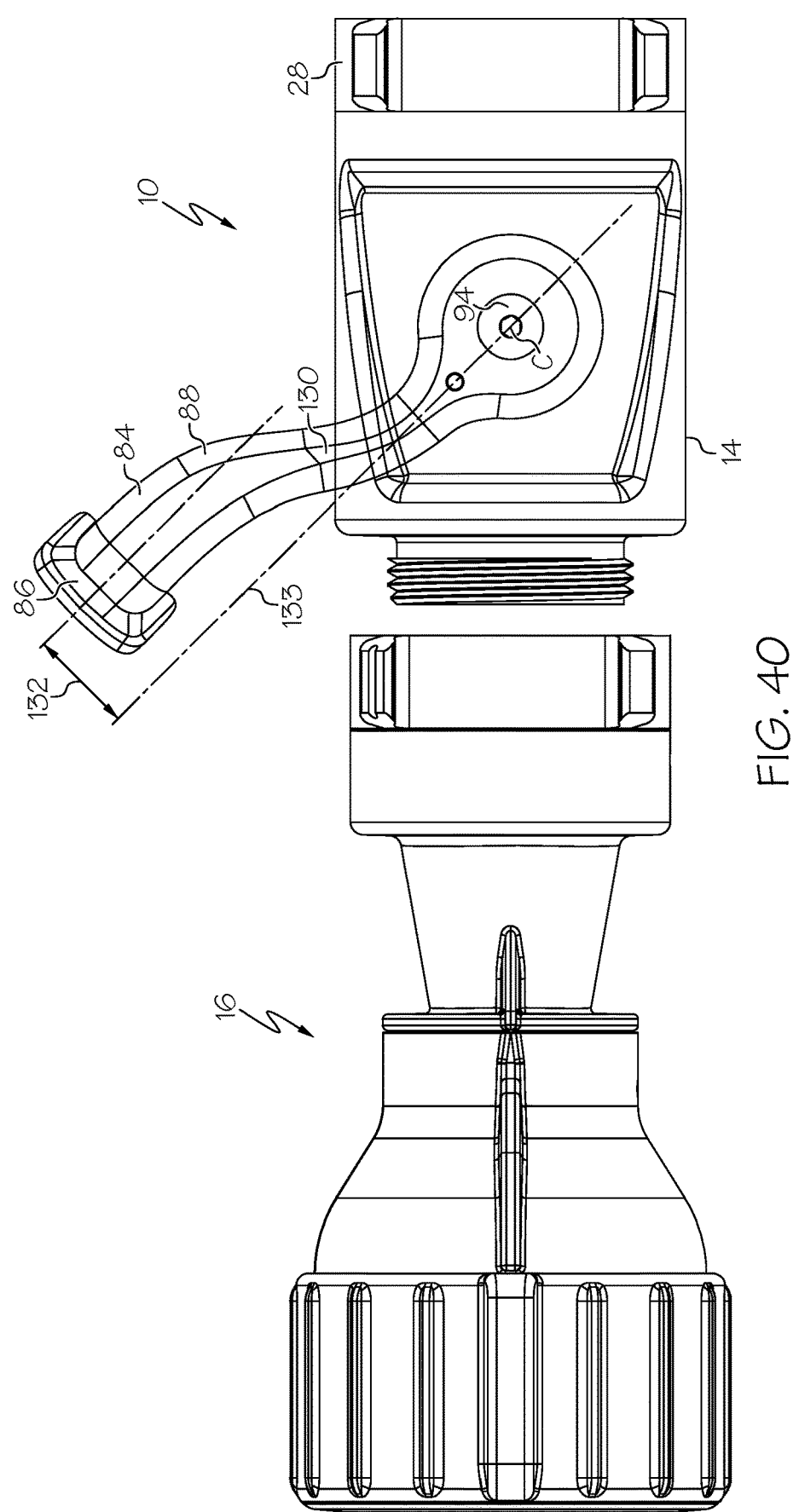
FIG. 40 shows the component and nozzle of FIG. 2, uncoupled from each other.

As noted above, in some cases, and shown in FIG. 40, the component 10 can be removably attachable to the nozzle 12, in one case by a threaded connection. In one embodiment the actuator 84 is configured to be spaced away, in the radial direction, from an axially downstream end of the component 10 to provide ease of attachment when the actuator 84 is in a forward position. In particular, as shown in FIG. 40, each leg of the actuator 84 can include a curved and/or angled relief portion 130 that moves in the upstream direction (along a length of the leg 88 moving away from the body 14) relative to a radial line/center line 133 drawn through the actuator axis (the axis C about which the actuator 84/blocking component 42 can rotate).

The relief portions 130 ensure that a distal end of each leg 88 and/or the gripping arm 86 is offset from the center line 133, spacing the gripping arm 86 in the upstream location compared to positions if the legs 88 did not include the relief portions 130. This it can be seen that this arrangement of the legs 88 provides an actuator 84 (and more particularly, the gripping arm 86 and/or distal ends of the legs 88 of the actuator 84) that is offset by the offset distance 132, compared to a handle utilizing straight legs, when the actuator 84 is in the forward position. The offset 132 provides greater access for a user to couple the component 10 and nozzle 12 together.

Figure 41:
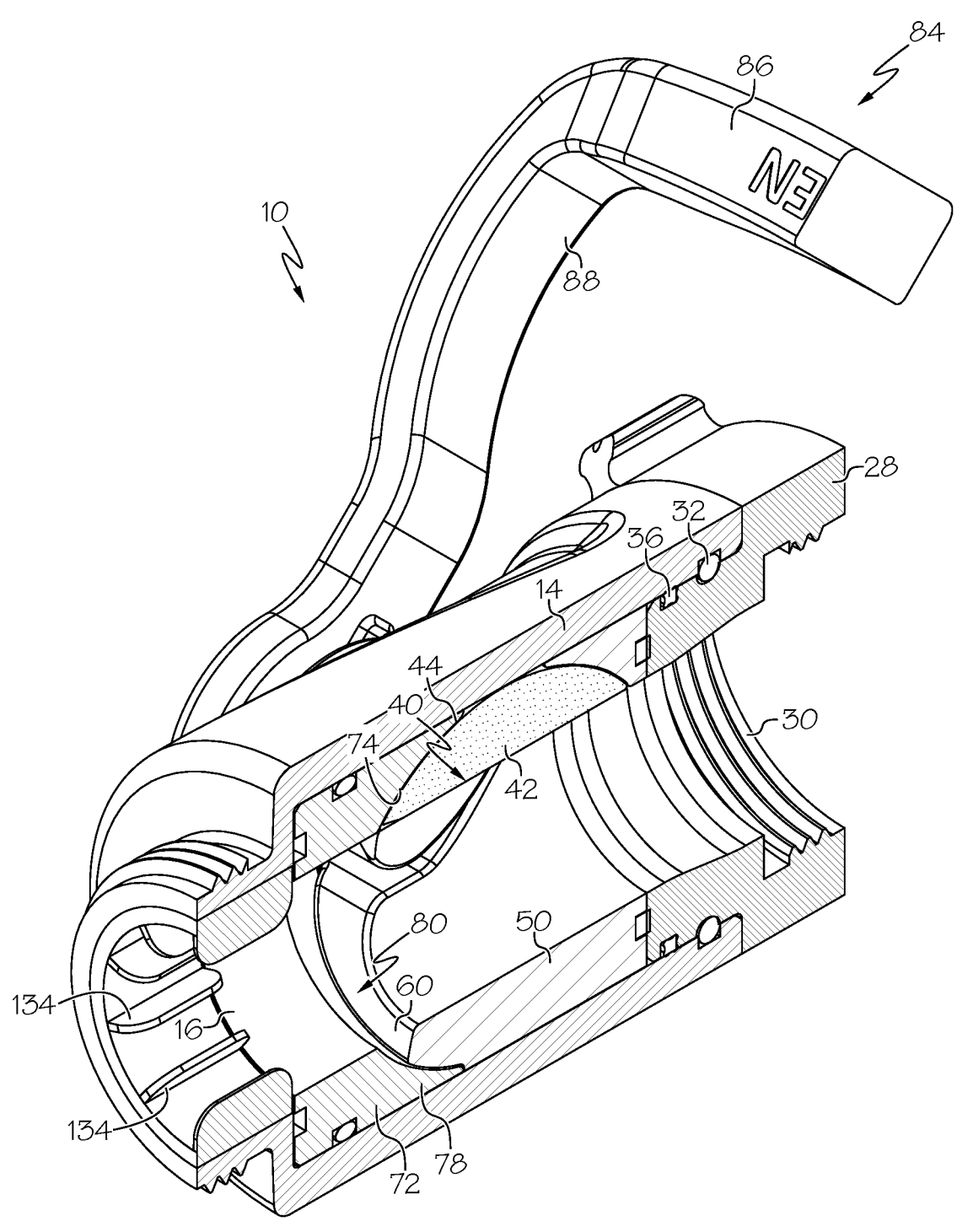
FIG. 41 is a front perspective view of the component of FIG. 1, shown with a set of straightening vanes.

While the valve 40/blocking component 42 can reduce turbulence in the fluid flow, fluid flowing through the valve 40/blocking component 42 can still experience some turbulence, such as when the valve 40/blocking component 42 is in the partially closed position. Thus as shown in FIG. 41 the component 10 can include a plurality of straightening devices/flow straightening vanes 134 extending circumferentially about the flow path 16. Each vane 134 can be a generally flat and planar, radially-aligned component that is positioned downstream of the blocking component 42 and extends into the flow path 16. These straightening devices 134 are designed to reduce turbulence but do not sufficiently block fluid flow to provide a significant pressure drop, and do not catch debris that may be present in the fluid flow. In the embodiment of FIG. 41, the straightening vanes 134 are regularly spaced and extend about an entire circumference of the component 10/flow path 16.

Figure 42:
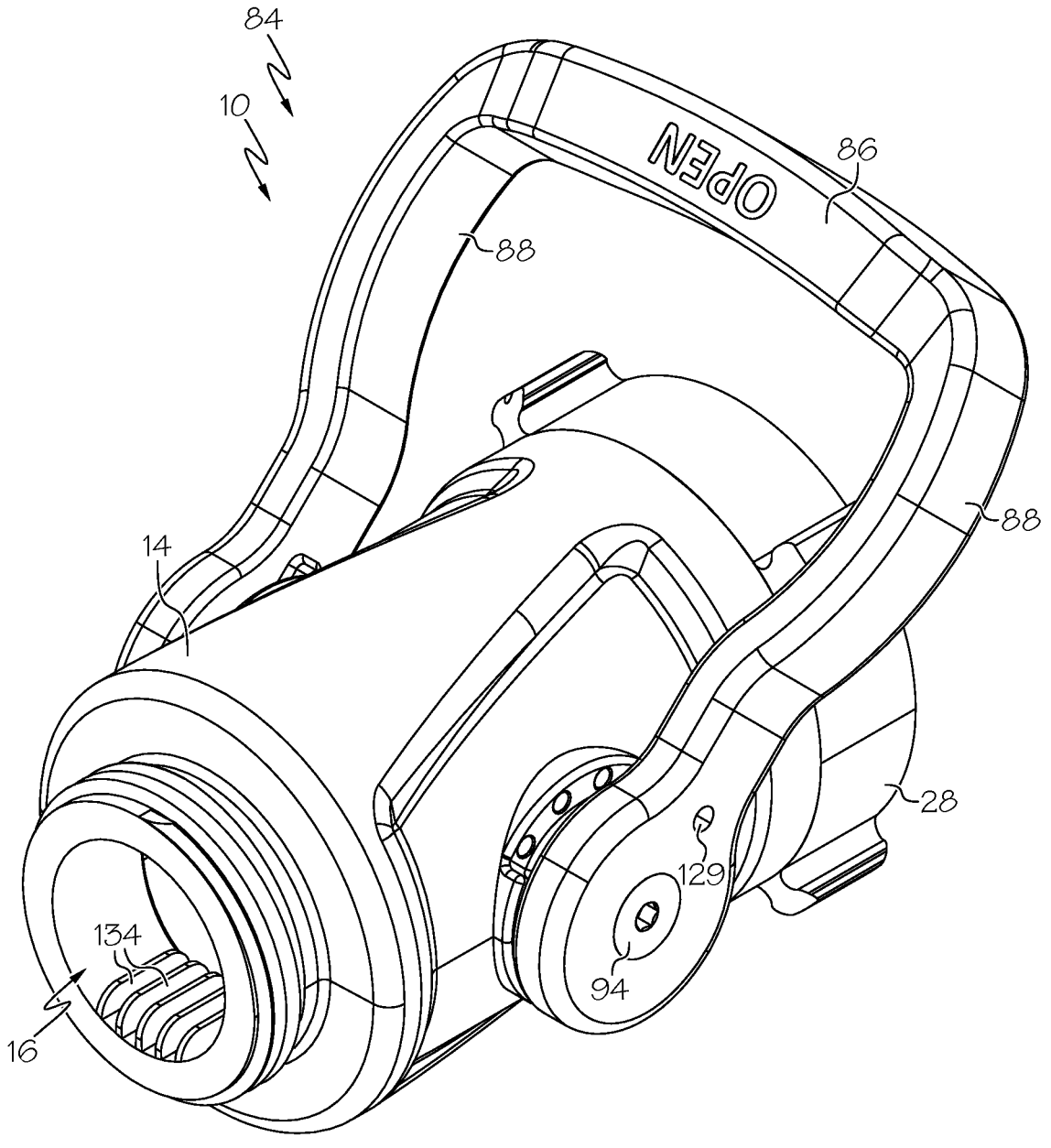
FIG. 42 is a front perspective view of the component of FIG. 1, shown with an alternative set of straightening vanes.

In an alternate embodiment shown in FIG. 42, the straightening vanes 134 may be positioned on only part of the circumference of the component 10/flow path 16, and are located in the lower portion of the flow path 16 in the embodiment of FIG. 42. The vanes 134 can be located in other segments of the flow path 16, such in the upper portion of the flow path 16 and/or the sides. Locating the vanes 134 at only part of the circumference of the component 10/flow path 16 can maximize the effect of the vanes 134 (if placed at areas of known turbulence) but minimize the amount of reduced cross section provided by the vanes 134.

Having described the invention in detail and by reference to certain embodiments thereof, it will be apparent that modifications and variations are possible without departing from the scope of the invention which is defined in the appended claims.

What is claimed is:

1. A fluid flow component comprising:
a body including a flow path therein;
a blocking component movable between a closed position where the blocking component blocks a flow of fluid through the flow path and an open position where the blocking component does not block the flow of fluid through the flow path, wherein the blocking component is rotatable about a center axis and includes a partial spherical outer surface that extends 270 degrees or less relative to the center axis, wherein the fluid flow component is configured such that when the blocking component is in the closed position, in cross section taken along a plane parallel to flow path and through a geometric center of the partial spherical outer surface, where the plane is perpendicular to an axis of rotation of the blocking component, the blocking component is entirely located on only one side of the flow path relative to the geometric center;
an inlet seat that at least partially overlaps with the blocking component along a length of the flow path, wherein an inner surface of the inlet seat is aligned with a portion of the body located immediately upstream of the inlet seat; and
an actuator operatively coupled to the blocking component, wherein the actuator is manually operable to move the blocking component between the open position and the closed position.

2. The component of claim 1 wherein the inner surface of the inlet seat is an upstream portion of the inner surface of the inlet seat and is aligned, in a radial direction, with the portion of the body located immediately upstream of the inlet seat such that fluid flowing from the portion of the body located immediately upstream of the inlet seat flows smoothly into the inlet seat.

3. The component of claim 1 wherein the inner surface of the inlet seat is a cylindrical surface.

4. The component of claim 1 wherein the inner surface of the inlet seat overlaps with the blocking component along the length of the flow path when the blocking component is in its open position.

5. The component of claim 1 wherein the blocking component is configured to rotate about the center axis when moving between the open position and the closed position, and wherein a first portion of the blocking component is configured to sealingly engage a first portion of the inlet seat when the blocking component is in the open position, and wherein a second portion of the blocking component is configured to sealingly engage a second portion of the inlet seat when the blocking component is in the closed position, and wherein the first and second portions of the inlet seat are located on opposite sides of a central axis of the flow path.

6. The component of claim 1 wherein the inner surface of the inlet seat overlaps with at least about 50 percent of the blocking component along the length of the flow path when the blocking component is in the open position.

7. The component of claim 1 wherein the blocking component has a base portion which is a non-spherical edge of the blocking component that is positioned generally upstream of a center of the blocking component when the blocking component is in the open position, and wherein the inlet seat has a radially outer contoured portion with a shape complementary to a shape of the base portion such that the contoured portion closely receives the base portion when the blocking component is in the open position.

8. The component of claim 1 wherein the component includes a recess positioned adjacent a downstream edge of the inlet seat, wherein the recess is configured to receive a leading edge of the blocking component therein when the blocking component is in the closed position.

9. The component of claim 1 wherein the outer surface extends 270 degrees or less relative to the center axis thereof in a plane aligned with a center of the component, where the plane is parallel to the flow path.

10. The component of claim 1 wherein a dimension of the flow path through the blocking component in at least one direction oriented perpendicular to a central axis of the flow component is the same when the blocking component is in a partially closed position as compared to when the blocking component is in the open position.

11. The component of claim 1 wherein the inlet seat has a generally annular shielding section configured to axially overlap with a recess configured to receive at least part of the blocking component when the blocking component is in the closed position.

12. The component of claim 1 wherein the inlet seat has a recessed area positioned opposite the blocking component in a radial direction when the blocking component is in the closed position.

13. The component of claim 1 further comprising an outlet seat positioned generally downstream of the blocking component, wherein the blocking component is configured to sealingly engage the outlet seat about a perimeter of the flow path when the blocking component is in the closed position, and wherein the blocking component is configured to not sealingly engage the outlet seat about a perimeter of the flow path when the blocking component is in the open position.

14. The component of claim 13 wherein the inlet seat includes an undercut at a downstream location thereof that is sized and configured to receive a correspondingly-shaped radially outer, upstream edge of the outlet seat therein.

15. The component of claim 13 further comprising a seal configured to be positioned between and sealingly engage the outlet seat and the blocking component when the blocking component is in the closed position.

16. The component of claim 13 wherein the outlet seat has a relatively thin lip at or adjacent to at its radially inner surface, wherein the lip is configured to sealingly engage the blocking component when the blocking component is in in the closed position, and wherein the component has at least one of a seal or an O-ring positioned between the outlet seat and the body, and wherein the body has an axially extending lip positioned radially inside the at least one of a seal or O-ring to retain the at least one of a seal or O-ring in place.

17. The component of claim 1 wherein the component includes a pair of stems coupled to the actuator, and wherein each stem is coupled to at least one of the blocking component or the actuator by a dovetail connection, wherein each dovetail connection includes a male and a female component, wherein the male component is sized smaller than the female component to form a relatively loose fit therebetween during assembly, and wherein each dovetail connection is configured to be pulled tight after assembly.

18. The component of claim 1 wherein the actuator is rotationally coupled to the body along an actuator axis, wherein the actuator includes a transversely-oriented gripping arm and two legs, each leg extending from an opposing end of the gripping arm to opposite outer locations on the body, and wherein a distal end of each leg is offset from a radial line passing through the actuator axis.

19. The component of claim 1 wherein the body includes a plurality of generally flat and planar, radially-aligned vanes positioned downstream of the blocking component and extending into the flow path.

20. The component of claim 1 wherein the partial spherical surface of the blocking component is continuous and the blocking component lacks any opening formed therethrough extending through the spherical surface.

21. A fluid flow component comprising:
a body including a flow path therein;
a blocking component movable between a closed position where the blocking component blocks a flow of fluid through the flow path and an open position where the blocking component does not block the flow of fluid through the flow path, wherein the blocking component is rotatable about a center axis and includes a partial spherical outer surface that extends 270 degrees or less relative to the center axis;
an inlet seat that at least partially overlaps with the blocking component along a length of the flow path, wherein an inner surface of the inlet seat is aligned with a portion of the body located immediately upstream of the inlet seat;
an outlet seat positioned generally downstream of the blocking component, wherein the blocking component is configured to sealingly engage the outlet seat about a perimeter of the flow path when the blocking component is in the closed position, and wherein the blocking component is configured to not sealingly engage the outlet seat about a perimeter of the flow path when the blocking component is in the open position;
an elastically deformable component positioned between the body and the outlet seat and configured to urge the outlet seat in an upstream direction; and
an actuator operatively coupled to the blocking component, wherein the actuator is manually operable to move the blocking component between the open position and the closed position.

22. A fluid flow component comprising:
a body including a flow path therein;
a blocking component movable between a closed position where the blocking component blocks a flow of fluid through the flow path and an open position where the blocking component does not block the flow of fluid through the flow path, wherein the blocking component is rotatable about a center axis and includes a partial spherical outer surface that extends 270 degrees or less relative to the center axis;
an inlet seat, wherein the blocking component is configured to sealingly engage the inlet seat when the blocking component is in at least one of the open or closed position, and wherein the component includes a recess positioned adjacent a downstream edge of the inlet seat, wherein the recess is configured to receive a leading edge of the blocking component therein when the blocking component is in the closed position; an outlet seat positioned generally downstream of the blocking component, wherein the blocking component is configured to sealingly engage the outlet seat about a perimeter of the flow path when the blocking component is in the closed position, and wherein the blocking component is configured to not sealingly engage the outlet seat about a perimeter of the flow path when the blocking component is in the open position, wherein the outlet seat has a relatively thin lip at or adjacent to at its radially inner surface, wherein the lip is configured to sealingly engage the blocking component when the blocking component is in in the closed position, and wherein the component has at least one of a seal or an O-ring positioned between the outlet seat and the body, and wherein the body has an axially extending lip positioned radially inside the at least one of a seal or O-ring to retain the at least one of a seal or O-ring in place; and
an actuator operatively coupled to the blocking component, wherein the actuator is manually operable to move the blocking component between the open position and the closed position.

23. The component of claim 22 wherein the component is configured such that at least one of the leading edge or the recess is in fluid communication with the flow path when the blocking component is in the open position.

24. A fluid flow component comprising:

a body including a flow path therein;

a blocking component movable between a closed position where the blocking component blocks a flow of fluid through the flow path and an open position where the blocking component does not block the flow of fluid through the flow path, wherein the blocking component is rotatable about a center axis and includes a partial spherical outer surface that extends 270 degrees or less relative to the center axis, wherein a dimension of the flow path through the blocking component in at least one direction oriented perpendicular to a central axis of the flow component is the same when the blocking component is in a partially closed position as compared to when the blocking component is in the open position; and an inlet seat that at least partially overlaps with the blocking component along a length of the flow path, wherein the inlet seat has a generally annular shielding section configured to axially overlap with a recess configured to receive at least part of the blocking component when the blocking component is in the closed position.

25. The component of claim 24 further comprising an actuator operatively coupled to the blocking component, wherein the actuator is manually operable to move the blocking component between the open position and the closed position.

26. A fluid flow component comprising:

a body including a flow path therein;

a blocking component movable between a closed position where the blocking component blocks a flow of fluid through the flow path and an open position where the blocking component does not block the flow of fluid through the flow path, wherein the blocking component is rotatable about a center axis and includes a partial spherical outer surface that extends 270 degrees or less relative to the center axis;

an inlet seat, wherein the blocking component is configured to sealingly engage the inlet seat when the blocking component is in at least one of the open or closed position; and an outlet seat positioned generally downstream of the blocking component, wherein the blocking component is configured to sealingly engage the outlet seat about a perimeter of the flow path when the blocking component is in the closed position, wherein the inlet seat and the outlet seat are in contact with each other, wherein the inlet seat includes an undercut at a downstream location thereof that receives a correspondingly-shaped radially outer, upstream edge of the outlet seat therein.

\* \* \* \* \*